(12) United States Patent
Matsushima et al.

(10) Patent No.: US 9,106,306 B2
(45) Date of Patent: *Aug. 11, 2015

(54) COMMUNICATION APPARATUS AND METHOD FOR CONTROLLING THE COMMUNICATION APPARATUS

(71) Applicant: CANON KABUSHIKI KAISHA, Tokyo (JP)

(72) Inventors: Shuichiro Matsushima, Tokyo (JP); Toshinori Koba, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 13/737,994

(22) Filed: Jan. 10, 2013

(65) Prior Publication Data

US 2013/0122815 A1 May 16, 2013

Related U.S. Application Data

(63) Continuation of application No. 12/534,013, filed on Jul. 31, 2009, now Pat. No. 8,369,783.

(30) Foreign Application Priority Data

Aug. 4, 2008 (JP) .................................. 2008-201191

(51) Int. Cl.
*H04B 7/00* (2006.01)
*H04B 7/24* (2006.01)
(Continued)

(52) U.S. Cl.
CPC .. *H04B 7/24* (2013.01); *G03B 7/00* (2013.01); *G08C 17/00* (2013.01); *H04N 5/232* (2013.01); *H04N 5/765* (2013.01); *H04N 5/77* (2013.01);
(Continued)

(58) Field of Classification Search
USPC .......... 455/41.1, 41.2, 41.3, 507, 508, 68, 78, 455/88, 556.1, 557, 343.5, 574, 127.5
See application file for complete search history.

(56) References Cited

U.S. PATENT DOCUMENTS 8,005,454 B1 * 8/2011 Lavelle et al. ............. 455/343.5
8,060,014 B2 * 11/2011 Ueda et al. ................... 455/41.2
(Continued)

FOREIGN PATENT DOCUMENTS

| JP | 07-141537 A | 6/1995 |
|---|---|---|
| JP | 09-138444 A | 5/1997 |

(Continued)

OTHER PUBLICATIONS

Japanese Office Action dated Jul. 27, 2012 for corresponding application No. JP2008-201191.

*Primary Examiner* — Ping Hsieh
(74) *Attorney, Agent, or Firm* — Carter, DeLuca, Farrell & Schmidt, LLP

(57) ABSTRACT

A method for controlling a communication apparatus includes communicating with an external device through close proximity wireless communication, receiving a remote control signal transmitted from a remote controller, storing a remote control setting which enables or disables an operation of the remote controller, making a determination as to whether a connection between the communication apparatus and the external device through the close proximity wireless communication is established, and controlling an operation of the remote controller for the communication apparatus on the basis of the determination.

35 Claims, 17 Drawing Sheets

(51) Int. Cl.
*G03B 7/00* (2014.01)
*G08C 17/00* (2006.01)
*H04N 5/232* (2006.01)
*H04N 5/765* (2006.01)
*H04N 5/77* (2006.01)
*H04N 21/41* (2011.01)
*H04N 21/4147* (2011.01)
*H04N 21/422* (2011.01)
*H04N 21/4363* (2011.01)

(52) U.S. Cl.
CPC ....... *H04N 21/4113* (2013.01); *H04N 21/4147* (2013.01); *H04N 21/42204* (2013.01); *H04N 21/43637* (2013.01)

(56) References Cited

U.S. PATENT DOCUMENTS

| | | | | |
|---|---|---|---|---|
| 2005/0221834 | A1* | 10/2005 | Kangas et al. | 455/452.1 |
| 2007/0160225 | A1* | 7/2007 | Seydoux | 381/79 |
| 2009/0023483 | A1* | 1/2009 | Griffin et al. | 455/575.1 |
| 2009/0247222 | A1* | 10/2009 | Bonnat | 455/557 |

FOREIGN PATENT DOCUMENTS

| | | |
|---|---|---|
| JP | 2007-081892 A | 3/2007 |
| JP | 2008-078793 A | 4/2008 |

* cited by examiner

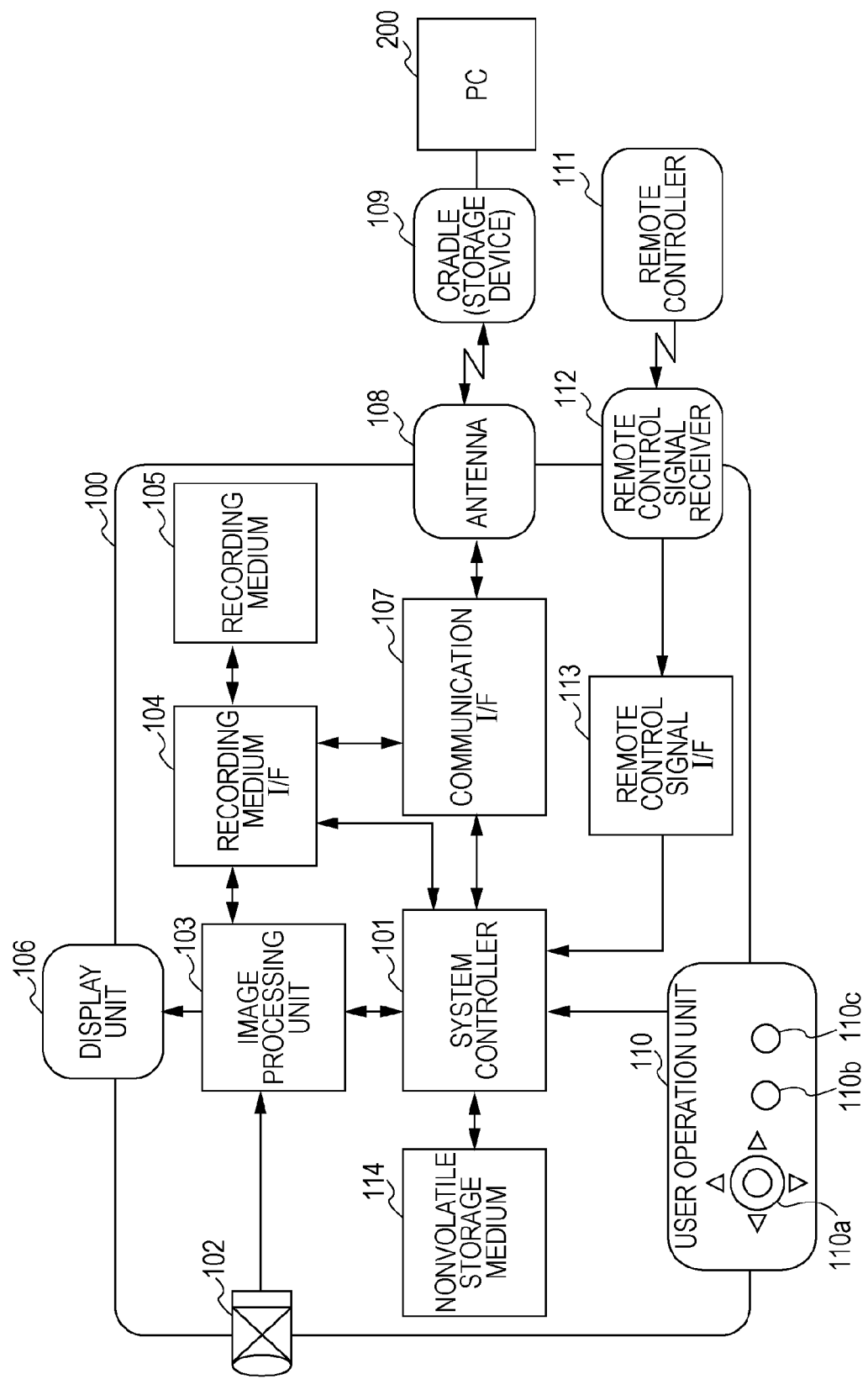

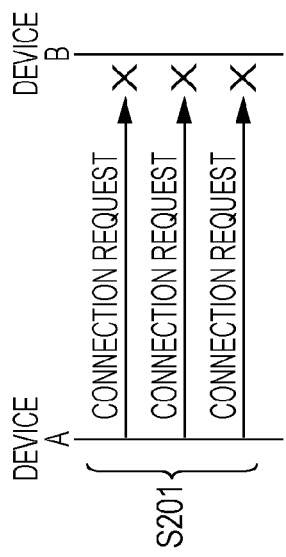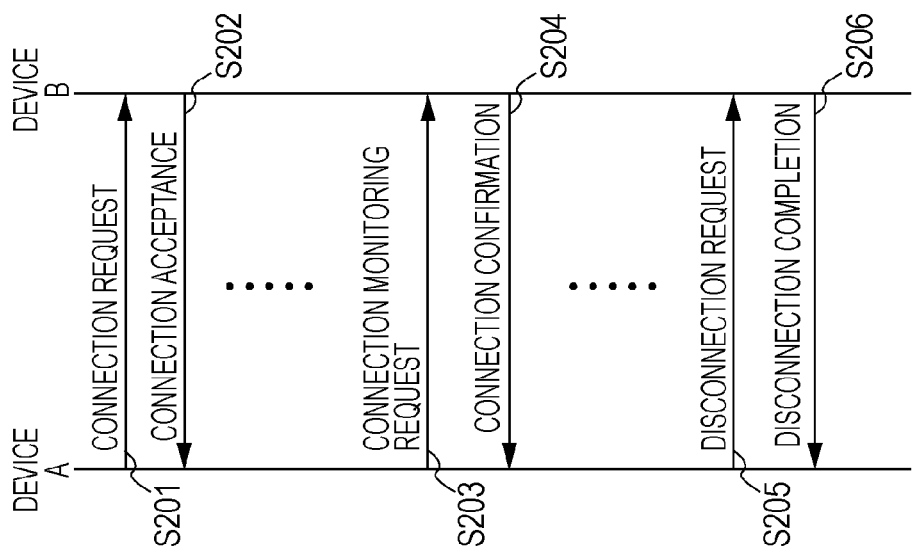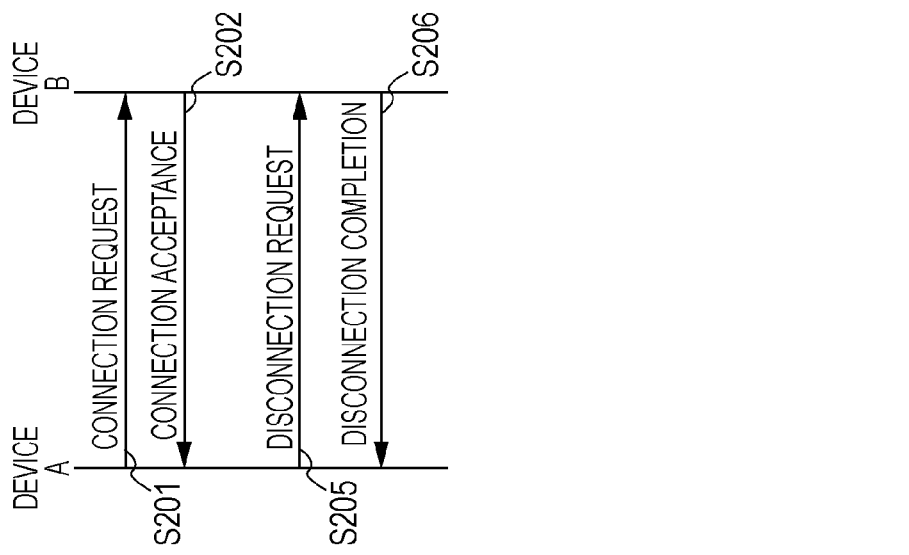

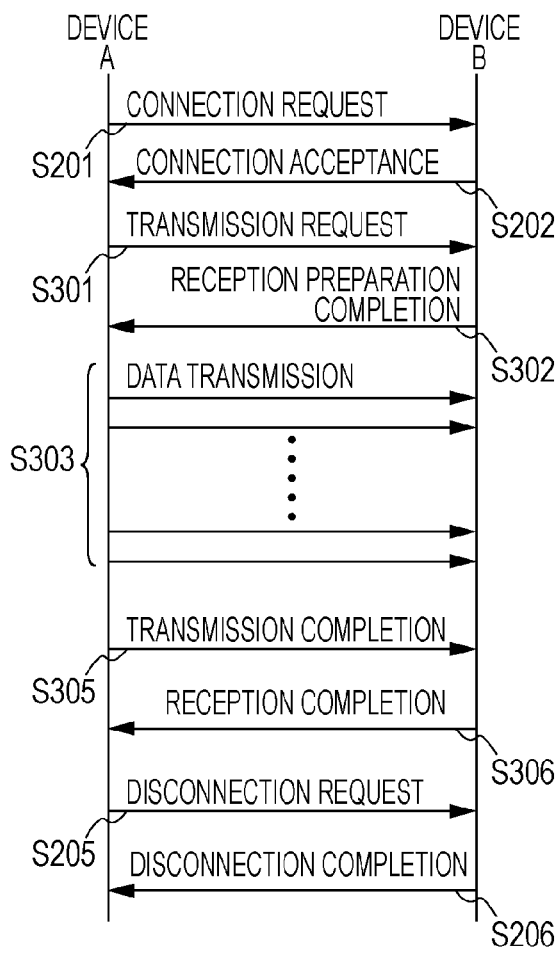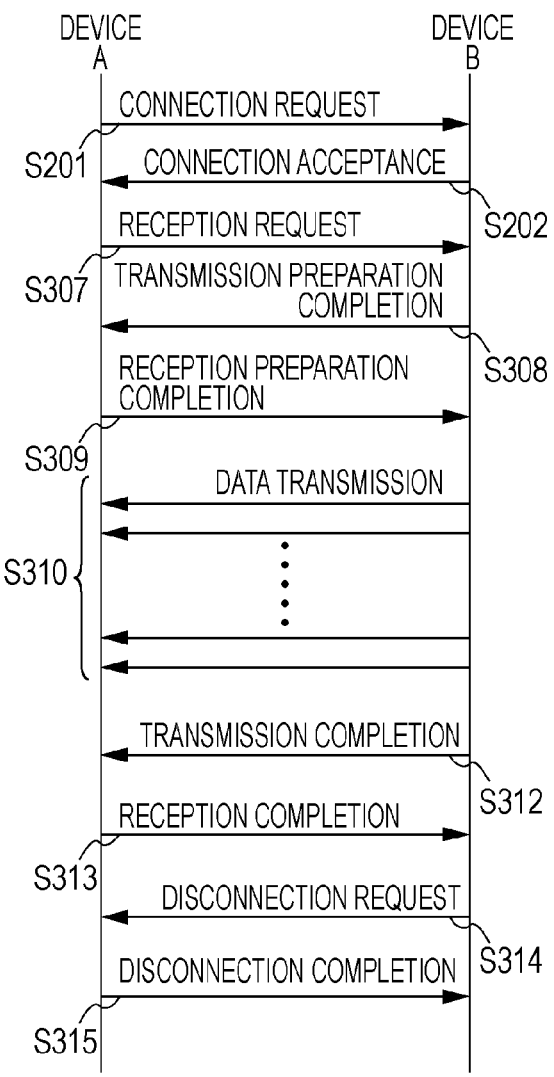

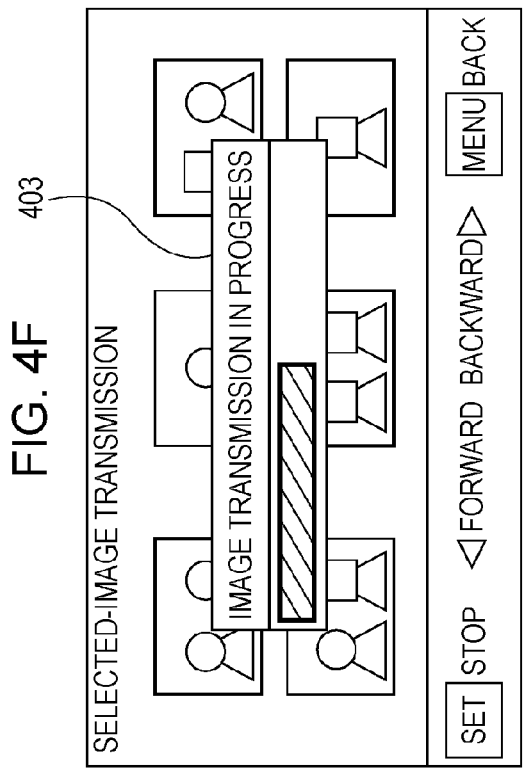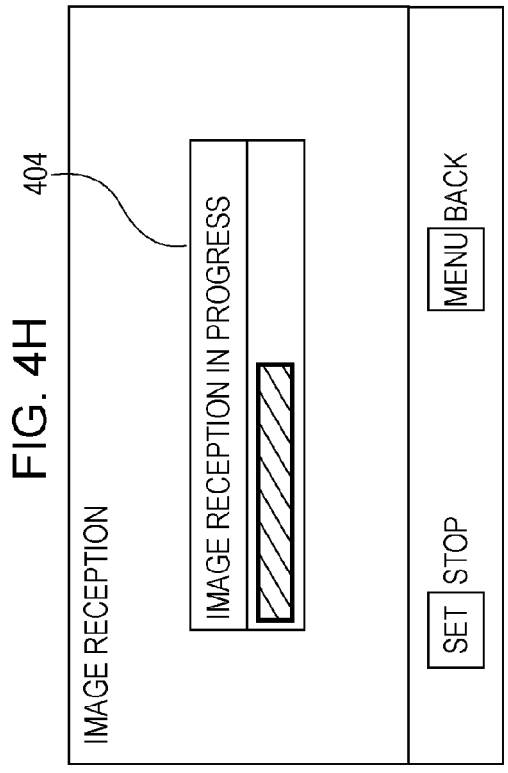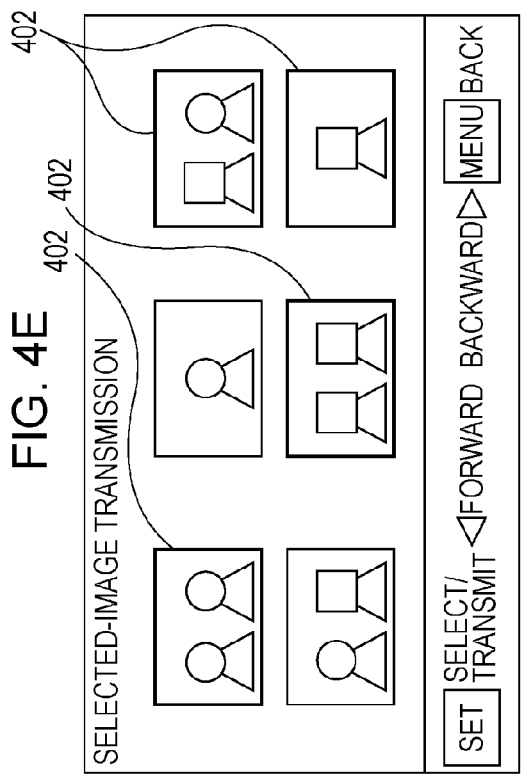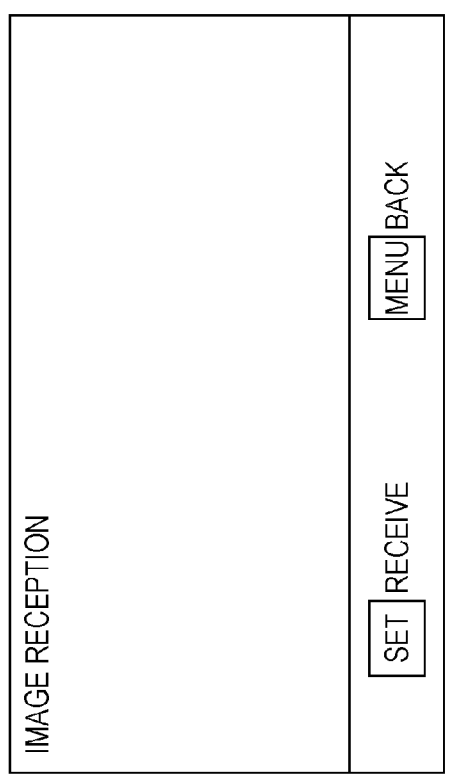

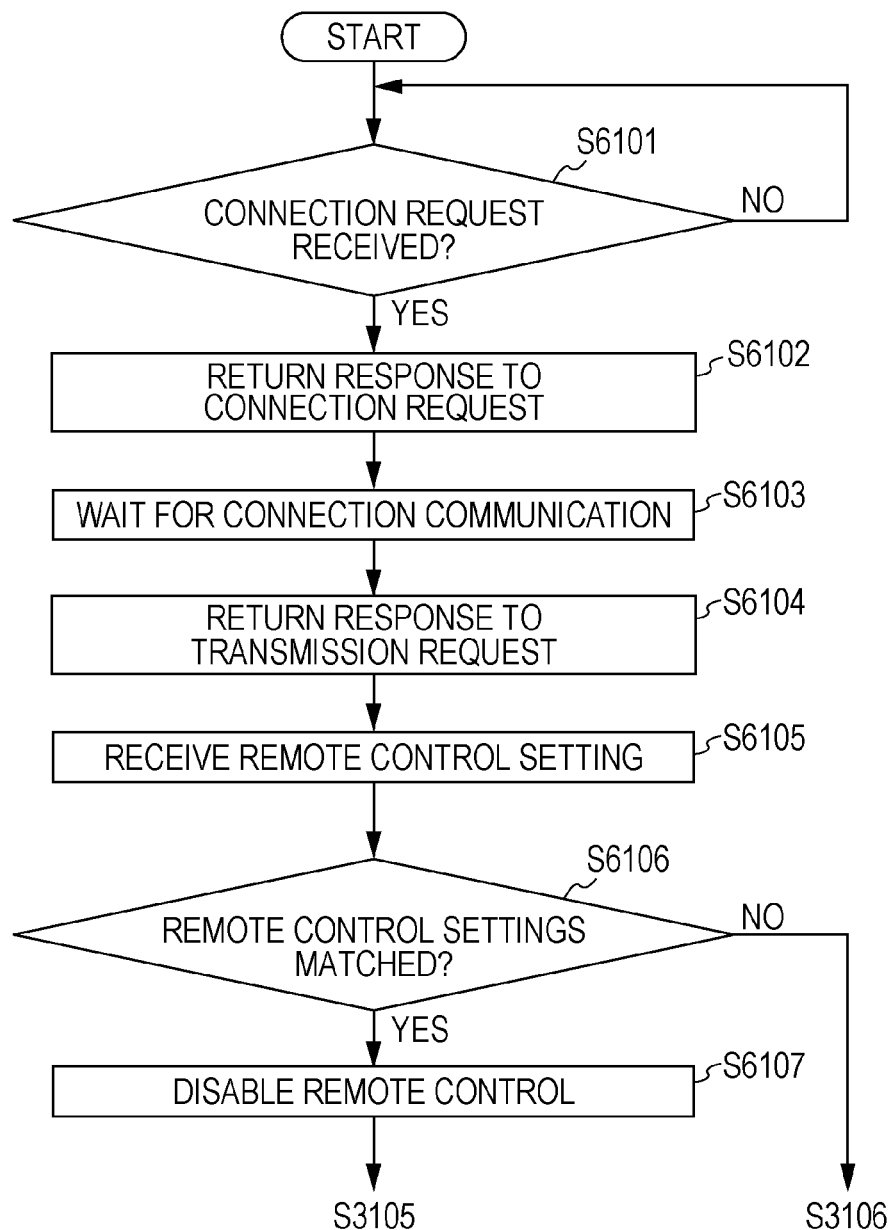

COMMUNICATION APPARATUS AND METHOD FOR CONTROLLING THE COMMUNICATION APPARATUS

CROSS REFERENCE TO RELATED APPLICATIONS

This application is a continuation of U.S. patent application Ser. No. 12/534,013, filed Jul. 31, 2009, which claims the benefit of and priority to Japanese Patent Application No. 2008-201191 filed Aug. 4, 2008, the entire contents of each of which are hereby incorporated by reference herein in their entirety.

BACKGROUND OF THE INVENTION

1. Field of the Invention

The present invention relates to communication apparatuses and methods for controlling the communication apparatuses. In particular, the present invention relates to a communication apparatus capable of performing close proximity wireless communication with an external device and a method for controlling the communication apparatus.

2. Description of the Related Art

In recent years, there have been developed systems using close proximity wireless communication technology and having a communication range of several centimeters to several tens of centimeters. Close proximity wireless communication is characterized by having a high transfer rate, a short communication range, and thus less impact on other wireless systems. Therefore, close proximity wireless communication technology is suitable for use in wireless data communication between devices that can be placed close to each other.

For example, Japanese Patent Laid-Open No. 7-141537 discloses a contactless-medium processing apparatus in which a reader/writer is capable of reading and writing information from and to a card having a built-in antenna when the card is brought close to the reader/writer.

In addition to the card, communication terminals (e.g., mobile phones) having a contactless data communication function similar to that of the foregoing card are known today.

However, for data transmission etc., a known close proximity wireless communication apparatus requires the user to press buttons and perform other operations while holding his/her own device close to the apparatus. Therefore, it is difficult for the user to perform complicated operations, such as selecting data to be transmitted and giving instructions to transmit the data.

As a solution to such a problem, the user may use a remote controller to remotely control a close proximity wireless communication apparatus without directly manipulating it. Remotely controllable apparatuses generally allow the user to select whether to accept an operation of a remote controller. Therefore, every time close proximity wireless communication is performed, the user has to check the remote control setting of the apparatus and change the setting, as necessary, to accept an operation of the remote controller. This is a cumbersome process for the user.

SUMMARY OF THE INVENTION

The present invention provides a technique which improves usability of an apparatus by allowing the user to easily operate the apparatus while holding the apparatus within a communication range of close proximity wireless communication.

According to an aspect of the present invention, there is provided a communication apparatus including a communicating unit configured to communicate with an external device through close proximity wireless communication; a receiving unit configured to receive a remote control signal transmitted from a remote controller; a storage unit configured to store a remote control setting which enables or disables an operation of the remote controller; a determining unit configured to make a determination as to whether a connection with the external device through the close proximity wireless communication is established via the communicating unit; and a control unit configured to perform control such that when the determining unit determines that the connection is established, an operation corresponding to the remote control signal received by the receiving unit is performed regardless of the remote control setting.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

FIG. 1 is a block diagram illustrating an example configuration of a communication system according to an exemplary embodiment of the present invention.

FIG. 2A to FIG. 2C are sequence diagrams each illustrating a connection detecting process between a camera of an exemplary embodiment of the present invention and a storage apparatus.

FIG. 3A to FIG. 3D are sequence diagrams each illustrating a data communication process between a camera of an exemplary embodiment of the present invention and a storage apparatus.

FIG. 4A to FIG. 4H illustrate examples of graphical user interface (GUI) screens displayed on a display unit for operations of data transmission and reception in a camera according to an exemplary embodiment of the present invention.

FIG. 16 is a flowchart illustrating an operation of a camera serving as a receiving device of the third exemplary embodiment.

DESCRIPTION OF THE EXEMPLARY EMBODIMENTS

Exemplary embodiments, features and aspects of the present invention will now be described in detail below with reference to the attached drawings.

First Exemplary Embodiment

A first exemplary embodiment describes a system in which image data is transmitted from a digital camera (hereinafter referred to as "camera") to a storage apparatus through close proximity wireless communication. The image data, the camera, and the storage apparatus are merely examples of data, a communication apparatus capable of performing close proximity wireless communication, and an external device capable of performing close proximity wireless communication, respectively. The present invention is not limited to a particular combination of data and apparatuses described in the present exemplary embodiment.

In the present specification, the term "close proximity wireless communication" refers to wireless communication based on a communication protocol specified under the assumption that a communication distance is less than 1 m, or sometimes less than several tens of cm. Examples of such a communication protocol include a contactless communication protocol which provides a communication distance of about 70 cm or less, and a contactless communication protocol which provides a shorter communication distance of about 10 cm or less. Specifically, there are such standards as ISO/IEC 15693, ISO/IEC 14434, and ECMA-340 (ISO/IEC 18092).

Figure 10:
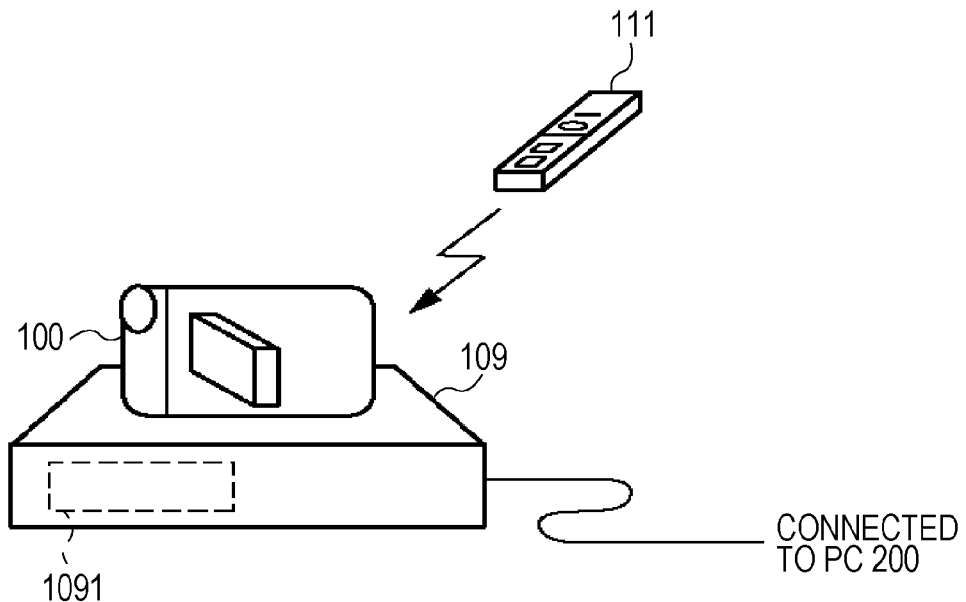
FIG. 10 schematically illustrates how the communication system of the first exemplary embodiment is used.

FIG. 10 schematically illustrates how a communication system of the present exemplary embodiment is used. The communication system includes a camera 100 capable of performing close proximity wireless communication, a remote controller 111 for remotely controlling the camera 100, and a storage apparatus 109 functioning as a cradle. The storage apparatus 109 capable of performing close proximity wireless communication includes a storage medium 1091, such as a hard disk drive. Image data received from the camera 100 through close proximity wireless communication can be stored in the storage medium 1091. The storage apparatus 109 is connected, for example, via a cable to a personal computer (PC) 200, and can operate under control of the PC 200.

FIG. 1 is a block diagram illustrating an example configuration of the communication system according to the present exemplary embodiment. The camera 100 includes a system controller 101 that controls an overall operation of the camera 100, and blocks that perform different functions. The system controller 101 includes, for example, a nonvolatile storage medium storing a control program, a central processing unit (CPU) executing the control program, and a random-access memory (RAM) used as a work area by the CPU. An image pickup unit 102 includes, for example, an optical system having an autofocus function and a zoom function, a motor for controlling the optical system, and an image pickup device such as a charge-coupled device (CCD) image sensor or a complementary metal-oxide semiconductor (CMOS) image sensor. The image pickup unit 102 forms a subject optical image on an image pickup surface of the image pickup device, causes the image pickup device to convert the subject optical image into electrical signals for respective pixels, and outputs the electrical signals. The electrical signals are converted by an image processing unit 103 into digital data. The image processing unit 103 performs image processing on the digital data in accordance with settings of the camera 100, and generates an image data file. The image data file is recorded through a recording medium interface (I/F) 104 in a recording medium 105, such as a semiconductor memory.

For playback of the image data file recorded in the recording medium 105, the image data file read out of the recording medium 105 is subjected to display processing by the image processing unit 103. Then, the resulting image is displayed on a display unit 106 in accordance with control of the system controller 101. The recording medium 105, which is included in the camera 100 of FIG. 1, may be a removable recording medium, such as a memory card.

The display unit 106 is, for example, a liquid crystal display (LCD). The display unit 106 displays various GUIs, such as menu screens, and images recorded in the recording medium 105. The display unit 106 may function as an electronic viewfinder that sequentially displays images picked up by the image pickup unit 102.

A communication interface 107 connects and disconnects close proximity wireless communication with an external device through the antenna 108. Additionally, the communication interface 107 uses an established communication connection to perform data communication with the external device.

The PC 200 has a configuration similar to that of the camera 100. For example, the PC 200 includes a CPU, a RAM, a storage medium, and a communication interface.

The camera 100 may be controlled by one piece of hardware. Alternatively, multiple pieces of hardware may perform different tasks to ultimately control the entire camera 100. The same applies to controlling the PC 200.

The communication system of the present exemplary embodiment allows intercommunication between the camera 100 and the storage apparatus 109. This means that image data recorded in the recording medium 105 of the camera 100 can be transmitted to and stored in the storage apparatus 109, while image data stored in the storage apparatus 109 can be transmitted to the camera 100 and recorded in the recording medium 105.

A user operation unit 110 is an instruction unit provided for the user to give instructions to the camera 100. An operation of the user operation unit 110 is notified to the system controller 101. The system controller 101 controls each part of the camera 100 to realize an operation corresponding to the operation of the user operation unit 110. In the present exemplary embodiment, the user operation unit 110 includes arrow keys 110a (also referred to as "direction keys" or "cursor keys"), a set key 110b (also referred to as "enter key" or "execute key"), and a menu key 110c.

As described above, the camera 100 is capable of being remotely controlled by the remote controller 111. A signal (e.g., an infrared signal) from the remote controller 111 is received by a remote control signal receiver 112, and input through a remote control signal interface 113 to the system controller 101. The system controller 101 controls each part of the camera 100 to realize an operation corresponding to the operation of the remote controller 111. As will be described below, a setting (remote control setting) indicating whether to accept a remote control signal (i.e., remote control) can be made by the user through a menu operation on the user operation unit 110.

The remote controller 111 is provided with operation keys which are the same as those of the user operation unit 110 of the camera 100. A setting indicating whether to accept remote control is stored, for example, in a nonvolatile storage medium 114. The setting stored in the nonvolatile storage medium 114 is changed when there is a change in setting.

(Connection Detecting Process)

With reference to sequence diagrams of FIG. 2A to FIG. 2C, a connection detecting process performed between the camera 100 and the storage apparatus 109 will be described.

In communication procedures illustrated in FIG. 2A to FIG. 2C, since roles of the camera 100 and the storage apparatus 109 are replaceable, a device that sends a connection request is referred to as "device A" and a device that responds to the connection request is referred to as "device B". Thus, the communication procedures illustrated in FIG. 2A to FIG. 2C will be described as general procedures of close proximity wireless communication.

To perform close proximity wireless communication, it is necessary that an antenna of device A and an antenna of device B be located within a predetermined short distance (hereinafter referred to as "communication range"). When a connection request is sent from device A, if the antenna of device B is located outside the communication range, device B cannot receive the connection request (step S201) as illustrated in FIG. 2A. As a result, since there is no response from device B to the connection request, a connection between the devices is not established here.

When a distance between the antennas of device A and device B (hereinafter, simply referred to as "distance between device A and device B") is within the communication range, a process for establishing a connection between the devices is performed.

FIG. 2B illustrates a connection procedure performed when device A sends a connection request to device B, the procedure being performed in a system where a communication connection is established when device A and device B approach each other within a communication range, and the established communication connection is maintained until device A and device B are separated and the distance therebetween falls outside the communication range.

Upon receipt of a connection request (step S201) from device A, if device B returns a connection acceptance response (step S202) indicating acceptance of the connection to device A, the connection is established between device A and device B. When device A and device B are located within a connectable range, the connection between device A and device B is maintained until a disconnection request (step S205) is sent from device A and a disconnection completion response (step S206) from device B is received by device A.

In this system, it is necessary that device A periodically send a connection monitoring request (step S203) to monitor the connection. If a connection confirmation response (step S204) from device B is received, the connection between device A and device B is maintained. If no connection confirmation response is received, device A and device B are already disconnected. After a connection is established, if the distance between device A and device B falls outside the communication range, no response to the connection monitoring request (step S203) is received by device A. In this case, device A performs disconnection processing as response-reception timeout processing.

FIG. 2C illustrates a connection confirmation procedure between device A and device B in a system where connection and disconnection are performed for every data transmission and reception. A connection between device A and device B can be confirmed when device A sends a connection request (step S201) and receives a connection acceptance response (step S202) from device B. The procedure of FIG. 2C does not involve data transmission and reception. Therefore, after the connection is confirmed and a disconnection request (step S205) is sent from device A, the connection between device A and device B is terminated.

There has been described the case where the establishment of a connection between device A and device B is confirmed on the basis of the establishment of wireless communication. Alternatively, the establishment of a connection between device A and device B may be confirmed on the basis of the strength of communication radio waves or a mechanical state of a switch.

(Data Communication Process)

With reference to sequence diagrams of FIG. 3A to FIG. 3D, a data communication process between the camera 100 and the storage apparatus 109 will be described.

In communication procedures illustrated in FIG. 3A to FIG. 3D, since roles of the camera 100 and the storage apparatus 109 are replaceable, a device that sends a request is referred to as "device A" and a device that responds to the request is referred to as "device B". Thus, the communication procedures illustrated in FIG. 3A to FIG. 3D will be described as general procedures of close proximity wireless communication. In FIG. 3A to FIG. 3D, steps identical to those in FIG. 2A to FIG. 2C are given the same reference numerals.

Figure 3A:
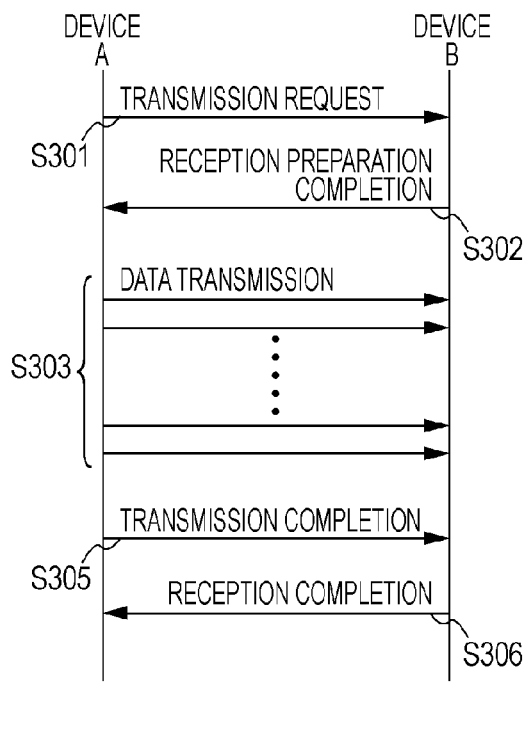

FIG. 3A illustrates a procedure of a data transmission process performed in a system where a communication connection is established when device A and device B approach each other within a communication range, and the established communication connection is maintained until device A and device B are separated and the distance therebetween falls outside the communication range.

When device A sends a data transmission request (step S301) to device B, device B prepares for data reception and returns a response (step S302) indicating completion of preparation for data reception to device A. Upon receipt of this response, device A transmits data to device B (step S303). Upon completion of the data transmission, device A notifies device B of the completion of the data transmission (step S305). Upon receipt of this notification, device B notifies device A of the completion of the data reception (step S306). The data transmission process thus ends.

Figure 3B:
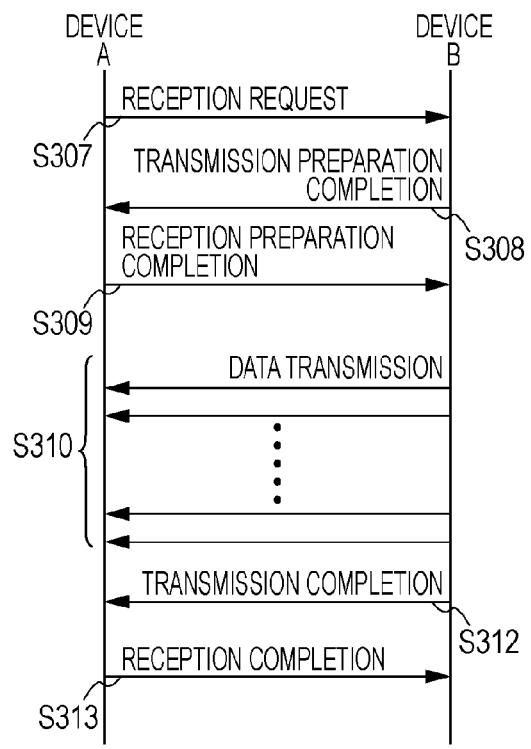

FIG. 3B illustrates a procedure of a process performed when data is transmitted from device B to device A (i.e., device A receives data from device B). First, device A sends a data reception request to device B (step S307). In response to this request, device B prepares for data transmission and returns a response (step S308) indicating completion of preparation for data transmission to device A. Upon receipt of this response, device A prepares for data reception and notifies device B of completion of the reception preparation (step S309). Upon receipt of this notification, device B transmits data to device A (step S310). Upon completion of the data transmission, device B notifies device A of completion of the data transmission (step S312). Upon receipt of this notification, device A notifies device B of the completion of the data reception (step S313). The data reception process thus ends.

FIG. 3C and FIG. 3D illustrate a procedure of a data transmission process and a procedure of a data reception process, respectively, which are performed in the system (see FIG. 2C) where connection and disconnection are performed for every data transmission and reception. As will be apparent from FIG. 3C and FIG. 3D, procedures of data transmission and reception processes are the same as those illustrated in FIG. 3A and FIG. 3B. The process of connection and disconnection illustrated in FIG. 2C is performed before and after each of the data transmission and reception processes in FIG. 3C and FIG. 3D.

The data exchanged in the data transmission and reception processes is not limited to image data, and may be a command for controlling the devices.

(GUI of Camera 100)

With reference to FIG. 4A to FIG. 4H, a description will be given about examples of GUI screens displayed on the display unit 106 for data transmission and reception in the camera 100 of the present exemplary embodiment.

If the menu key 110c is pressed when the camera 100 is in a playback mode, the system controller 101 displays a menu screen (see FIG. 4A) of the playback mode on the display unit 106. GUI screen data is stored in advance in the nonvolatile storage medium within the system controller 101 or in the nonvolatile storage medium 114.

When "wireless communication" is selected from items on the menu screen and the set key 110b is pressed, the system controller 101 displays a wireless communication menu screen (see FIG. 4B) on the display unit 106. In the present exemplary embodiment, a wireless communication menu provides the following three items: "image transmission mode" which allows transmission of a single image currently displayed on the display unit 106, "selected-image transmission mode" allows transmission of multiple images selected on a thumbnail screen, and "image reception mode" which allows image reception from an external device.

Figure 4A:
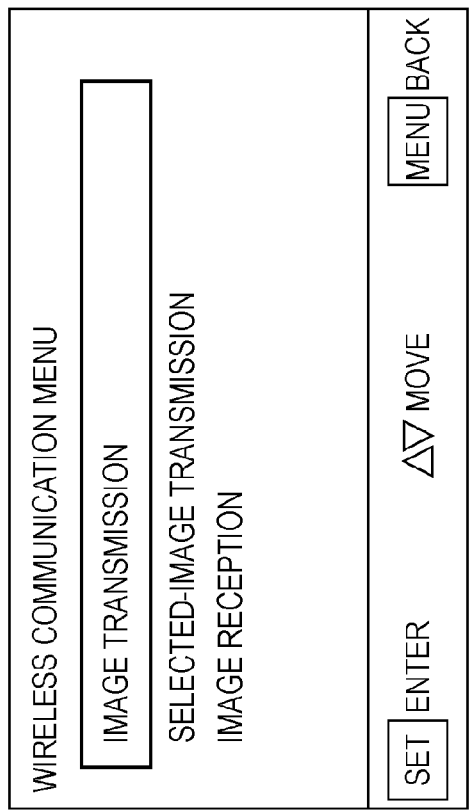
Figure 4B:
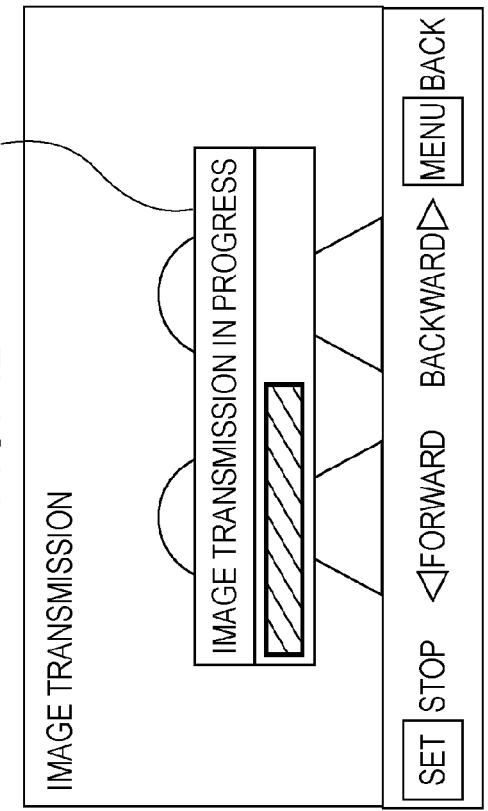
Figure 4C:
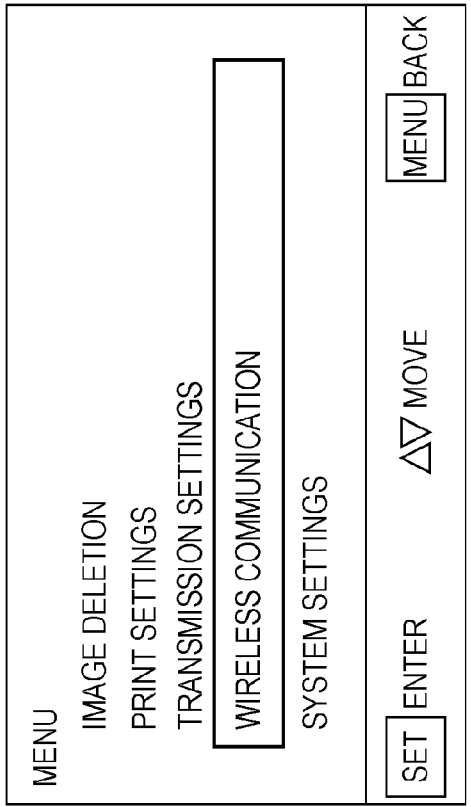

FIG. 4C illustrates an example of a single-image playback screen displayed by the system controller 101 on the display unit 106 when "image transmission" is selected on the wireless communication menu screen and the set key 110b is pressed. An image displayed on the single-image playback screen can be determined by the system controller 101 in accordance with given conditions or user settings. For example, an image displayed on the single-image playback screen may be the most recently captured image among those recorded in the recording medium 105.

When the set key 110b is pressed on the single-image playback screen, the system controller 101 reads image data corresponding to the currently displayed image from the recording medium 105, and starts transmitting the image data through the communication interface 107 to the storage apparatus 109.

Figure 4D:
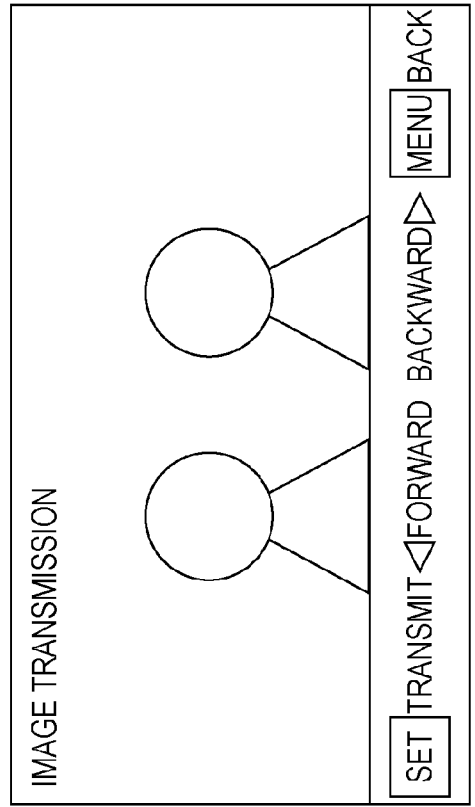

FIG. 4D illustrates an example of the single-image playback screen displayed while transmission is in progress. A progress bar 401 indicates the progress of the transmission. Upon completion of the transmission, the system controller 101 clears the progress bar 401 to restore the previous screen (see FIG. 4C) displayed before the transmission.

The system controller 101 changes the image displayed on the single-image playback screen, for example, in response to the operation of left and right keys of the arrow keys 110a. By manipulating the arrow keys 110a to display a desired image and pressing the set key 110b, the user can transmit any images one by one to the storage apparatus 109. In the present exemplary embodiment, the storage apparatus 109 stores received image data in an internal storage medium.

When the menu key 110c is pressed on the single-image playback screen, the system controller 101 displays the wireless communication menu (see FIG. 4B) on the display unit 106. The image transmission mode allows transmission of not only still image data, but also moving image data and audio data. For example, for transmission of moving image data, the first frame of a moving image data stream is displayed on the single-image playback screen in the image transmission mode. Then, when the set key 110b is pressed in this state or in a pause state during playback, the system controller 101 starts transmission of the moving image data stream. Since transmission of moving image data may take some time, if the set key 110b is pressed while the transmission is in progress (see FIG. 4D), the system controller 101 suspends the transmission.

FIG. 4E illustrates an example of a thumbnail playback screen displayed by the system controller 101 on the display unit 106 when "selected-image transmission" is selected on the wireless communication menu screen and the set key 110b is pressed. Images displayed on the thumbnail playback screen can be determined by the system controller 101 in accordance with given conditions or user settings. For example, images displayed on the thumbnail playback screen may be a predetermined number of the most recently captured images among those recorded in the recording medium 105.

The user selects one or more desired images from thumbnail images displayed on the thumbnail playback screen. For example, the system controller 101 moves the cursor in accordance with the operation of the arrow keys 110a. Then, a thumbnail image on which the cursor is placed when the set key 110b is pressed is brought into a selected state by the system controller 101. FIG. 4E illustrates a state where four thumbnail images 402 are in the selected state.

Upon detecting that the set key 110b has been pressed and held, the system controller 101 starts transmitting image data corresponding to the thumbnail images in the selected state.

FIG. 4F illustrates an example of the thumbnail playback screen displayed while transmission is in progress. A progress bar 403 indicates the progress of the transmission. Upon completion of the transmission, the system controller 101 clears the progress bar 403 to restore the previous screen (see FIG. 4E) displayed before the transmission.

As in the case of transmission of a moving image, if the set key 110b is pressed while the transmission is in progress (see FIG. 4F), the system controller 101 suspends the transmission.

FIG. 4G illustrates an example of a reception standby screen displayed by the system controller 101 on the display unit 106 when "image reception" is selected on the wireless communication menu screen and the set key 110b is pressed.

In an image reception mode, the camera 100 of the present exemplary embodiment can receive image data corresponding to a still image played back by an external device (with which a connection is established). If one or more images to be transmitted are in a selected state in the external device, the camera 100 can receive a set of image data corresponding to the selected one or more images. If an image to be received is a moving image, the camera 100 can receive moving image data which is in a pause state during playback in the external device. If a playlist is created by the external device, the camera 100 can receives both the playlist and moving image data included in the playlist.

FIG. 4H illustrates an example of a screen displayed during reception of data from the external device. A progress bar 404 indicates the progress of the reception. Upon completion of the reception, the system controller 101 clears the progress bar 404 to restore the previous screen (see FIG. 4G) displayed before the reception. If the set key 110b is pressed while the reception is in progress (see FIG. 4H), the system controller 101 suspends the reception.

The PC 200 connected to the storage apparatus 109 serving as an external device is capable of displaying the same wireless communication menu screen as that of FIG. 4B. This allows the user of the storage apparatus 109 to select a desired item on the wireless communication menu.

When controlling the storage apparatus 109 from the PC 200, if the user selects "image reception" on the wireless communication menu screen, the storage apparatus 109 enters a mode in which data from the camera 100 can be received.

The PC 200 may be a general-purpose computer on which a GUI-based operating system (OS) runs. The operation of a GUI displayed on a display device can be performed with a typical input device, such as a keyboard or a mouse. The PC 200 and the storage apparatus 109 can be connected to each other through a communication interface, such as a USB interface or an IEEE 1394 interface.

(Remote Control Setting)

Remote control setting in the camera 100 of the present exemplary embodiment will now be described.

Figure 5A:
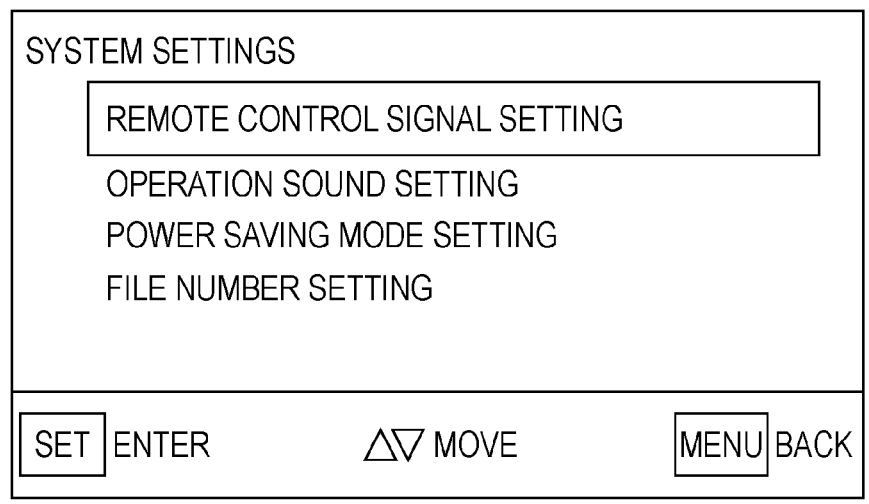
FIG. 5A and FIG. 5B illustrate examples of GUI screens displayed on a display unit for operations of remote control setting in a camera according to an exemplary embodiment of the present invention.
Figure 5B:
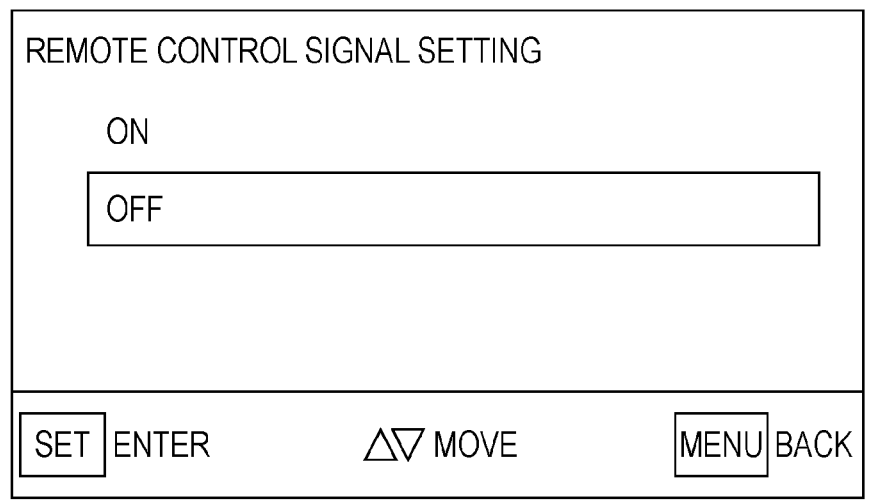

FIG. 5A and FIG. 5B illustrate examples of GUI screens displayed on the display unit 106 for operations of remote control setting in the camera 100 of the present exemplary embodiment.

FIG. 5A illustrates an example of a system setting screen displayed by the system controller 101 on the display unit 106 when "system settings" is selected on the menu screen and the set key 110b is pressed.

When "remote control signal setting" is selected on the system setting screen and the set key 110b is pressed, the system controller 101 displays a remote control signal setting screen (see FIG. 5B) on the display unit 106. When a connection through close proximity wireless communication with the storage apparatus 109 serving as an external device is established, "remote control signal setting" on the system setting screen is grayed out and unselectable.

Referring to FIG. 5B, when "ON" is selected and confirmed on the remote control signal setting screen, the camera 100 is set to be remotely controllable with a remote control signal received from the remote controller 111.

When "OFF" is selected and confirmed on the remote control signal setting screen, a remote control disabled mode is set, so that the camera 100 is not remotely controllable with the remote controller 111. When many users use cameras within a short distance, the remote control disabled mode prevents an own camera from erroneously operating due to the effect of remote controllers used by other persons.

The remote control setting selected on the remote control signal setting screen is stored by the system controller 101 in the nonvolatile storage medium 114, and the value of the remote control setting is maintained even after the camera 100 is turned off.

As described above, the remote controller 111 is also provided with the arrow keys 110a, the set key 110b, and the menu key 110c. Therefore, the GUI operations described with reference to FIG. 4A to FIG. 5B can be performed with the remote controller 111 if remote control is enabled.

(Operation for Reception of Remote Control Signal)

Figure 6:
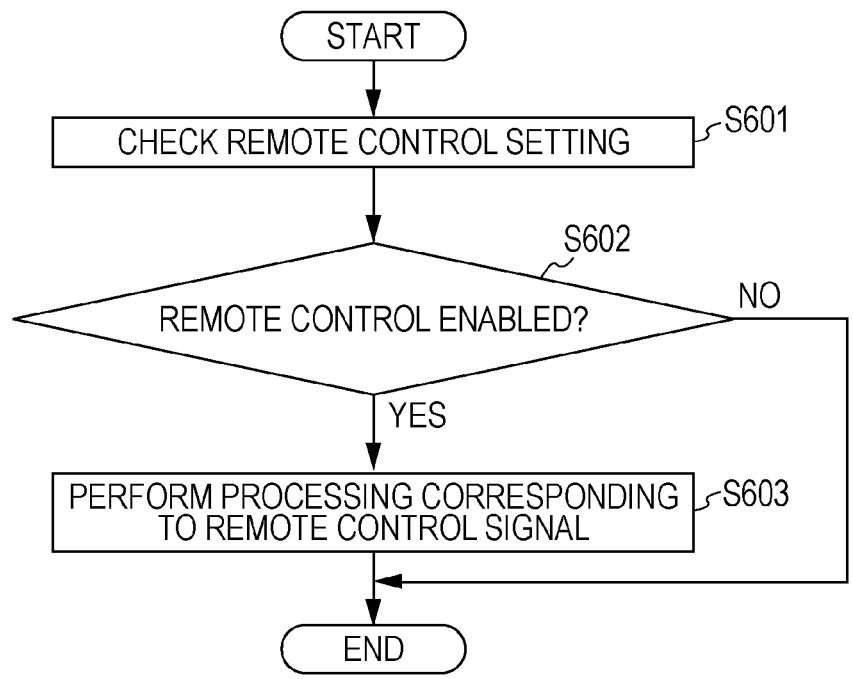
FIG. 6 is a flowchart illustrating an operation performed by a camera of the first exemplary embodiment upon receipt of a remote control signal.

FIG. 6 is a flowchart illustrating an operation performed by the camera 100 upon receipt of a remote control signal.

In step S601, upon detecting receipt of a remote control signal through the remote control signal interface 113, the system controller 101 checks a remote control setting stored in the nonvolatile storage medium 114. If the remote control setting is set to "ON" (YES in step S602), the process proceeds to step S603, where the system controller 101 controls each part of the camera 100 such that processing corresponding to the received remote control signal is performed. On the other hand, if the remote control setting is set to "OFF" (NO in step S602), the system controller 101 ignores the received remote control signal.

(Automatic Change of Remote Control Setting at the Time of Establishment or Termination of Communication Connection with External Device)

There will be described a process performed by the camera 100 of the present exemplary embodiment for automatically changing a remote control setting when a close proximity wireless communication connection with the storage apparatus 109 (external device) is established or terminated.

Figure 7:
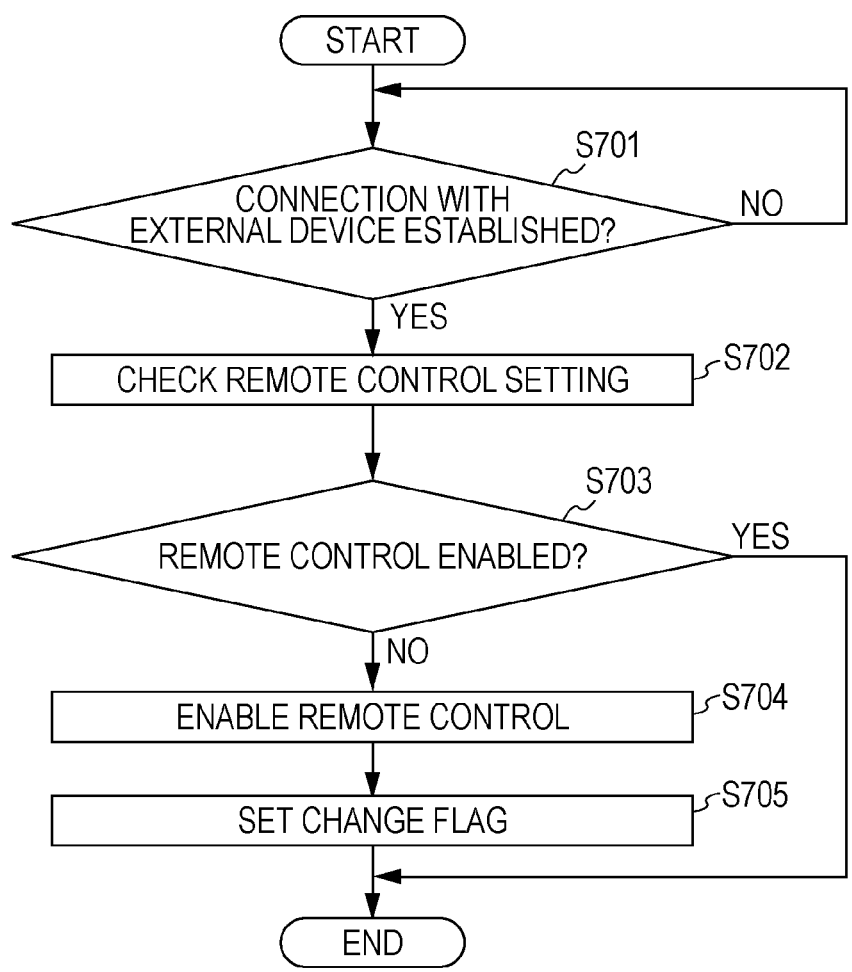
FIG. 7 is a flowchart illustrating a process performed by the camera of the first exemplary embodiment for automatically changing a remote control setting when a connection with a storage apparatus is established.
Figure 8:
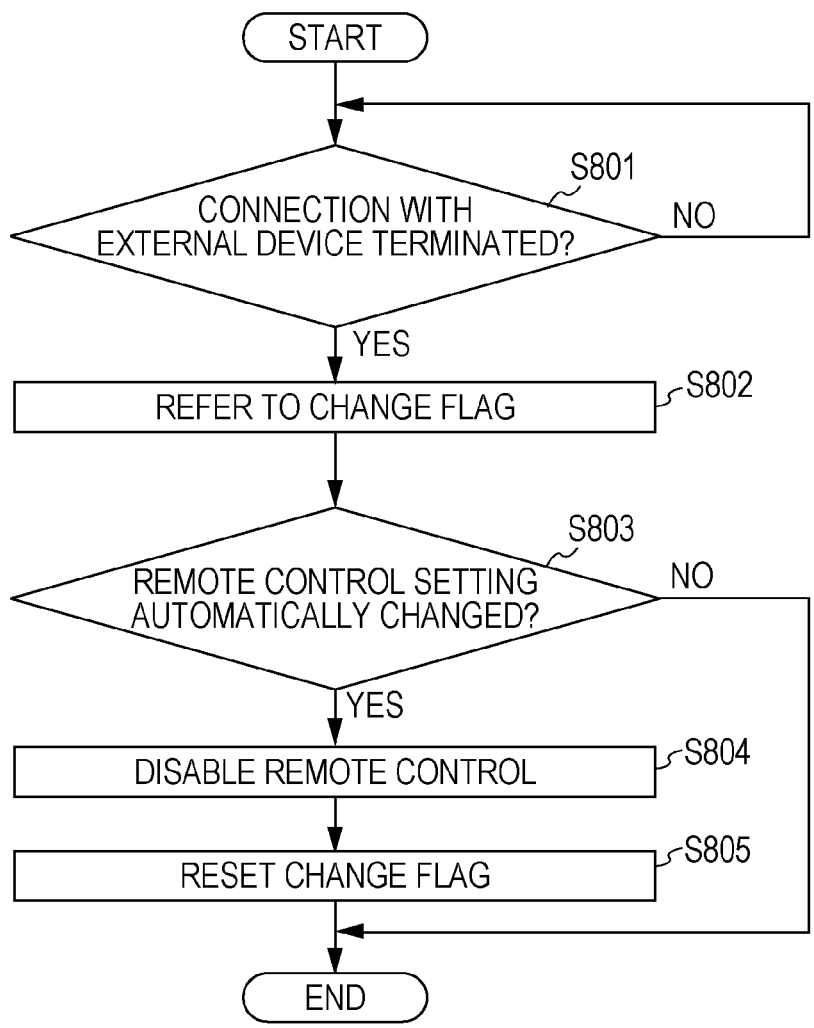
FIG. 8 is a flowchart illustrating a process performed by the camera of the first exemplary embodiment for automatically changing a remote control setting when a connection with the storage apparatus is terminated.

FIG. 7 is a flowchart illustrating a process performed by the camera 100 for automatically changing a remote control setting when a connection with the storage apparatus 109 is established. FIG. 8 is a flowchart illustrating a process performed by the camera 100 for automatically changing a remote control setting when a connection with the storage apparatus 109 is terminated. The processes illustrated in FIG. 7 and FIG. 8 are performed in the system where, as illustrated in FIG. 2C, a connection between device A and device B is maintained as long as they are located within a communication range.

When a connection with the external device through close proximity wireless communication is not established, the camera 100 performs the process illustrated in FIG. 7. In a communication standby state, the communication interface 107 of the camera 100 periodically sends a connection request (e.g., as illustrated in FIG. 2A) to search for an external device (storage apparatus 109) available for close proximity wireless communication. Then, when the camera 100 receives a connection acceptance response to the connection request, a close proximity wireless communication connection with the storage apparatus 109 is established.

In step S701 of FIG. 7, the system controller 101 waits until a close proximity wireless communication connection with the storage apparatus 109 is established.

Upon establishment of a connection with the storage apparatus 109 (YES in step S701), the system controller 101 reads a remote control setting from the nonvolatile storage medium 114 and checks the setting in step S702. If it is determined in step S703 that remote control is enabled (YES in step S703, i.e., the remote control setting is set to "ON"), the system controller 101 terminates the process without changing the remote control setting.

On the other hand, if it is determined in step S703 that remote control is disabled (NO in step S703, i.e., the remote control setting is set to "OFF"), the system controller 101 changes the remote control setting in the nonvolatile storage medium 114 to "ON" to enable remote control in step S704.

Then, in step S705, the system controller 101 sets a change flag to indicate that the original setting has been automatically changed. Specifically, the system controller 101 writes, to a predetermined address in the nonvolatile storage medium 114, a predetermined value (e.g., "1") indicating that the automatic change has been made. After setting the change flag, the system controller 101 terminates the process.

The camera 100 performs the process illustrated in FIG. 8 while a connection with an external device through close proximity wireless communication is maintained.

In step S801 of FIG. 8, the system controller 101 monitors whether a connection with the storage apparatus 109 through close proximity wireless communication has been terminated. As described with reference to FIG. 2B, if a disconnection request is sent or no response to a connection monitoring request is received, the communication interface 107 detects that the wireless connection has been terminated.

If the wireless connection with the storage apparatus 109 has been terminated (YES in step S801), the system controller 101 determines in step S802 whether a change flag in the nonvolatile storage medium 114 is set. If the change flag is set, that is, if the original remote control setting has been automatically changed upon establishment of the wireless connection (YES in step S803), the process proceeds to step S804. Then, the system controller 101 restores the remote control setting in the nonvolatile storage medium 114 to "OFF" in step S804 and resets the change flag in step S805. Specifically, in step S805, the system controller 101 writes, to a predetermined address in the nonvolatile storage medium 114, a predetermined value (e.g., "0") indicating that the automatic change has not been made. After resetting the change flag, the system controller 101 terminates the process.

If the change flag is not set, that is, if the original remote control setting has not been automatically changed upon establishment of the wireless connection (NO in step S803), the system controller 101 terminates the process without changing the remote control setting and the change flag.

FIG. 7 and FIG. 8 illustrate the processes performed in the system where the camera 100 monitors the connection with the storage apparatus 109 (i.e., a system where the camera 100 serves as device A and the storage apparatus 109 serves as device B). However, the same processes are applicable to the system where the storage apparatus 109 monitors the connection with the camera 100 (i.e., a system where the camera 100 serves as device B and the storage apparatus 109 serves as device A). In this case, upon receipt of a connection request from the storage apparatus 109, the system controller 101 detects establishment of a connection in step S701. Also, upon receipt of a disconnection request from the storage apparatus 109, the system controller 101 detects termination of a connection in step S801.

Figure 9:
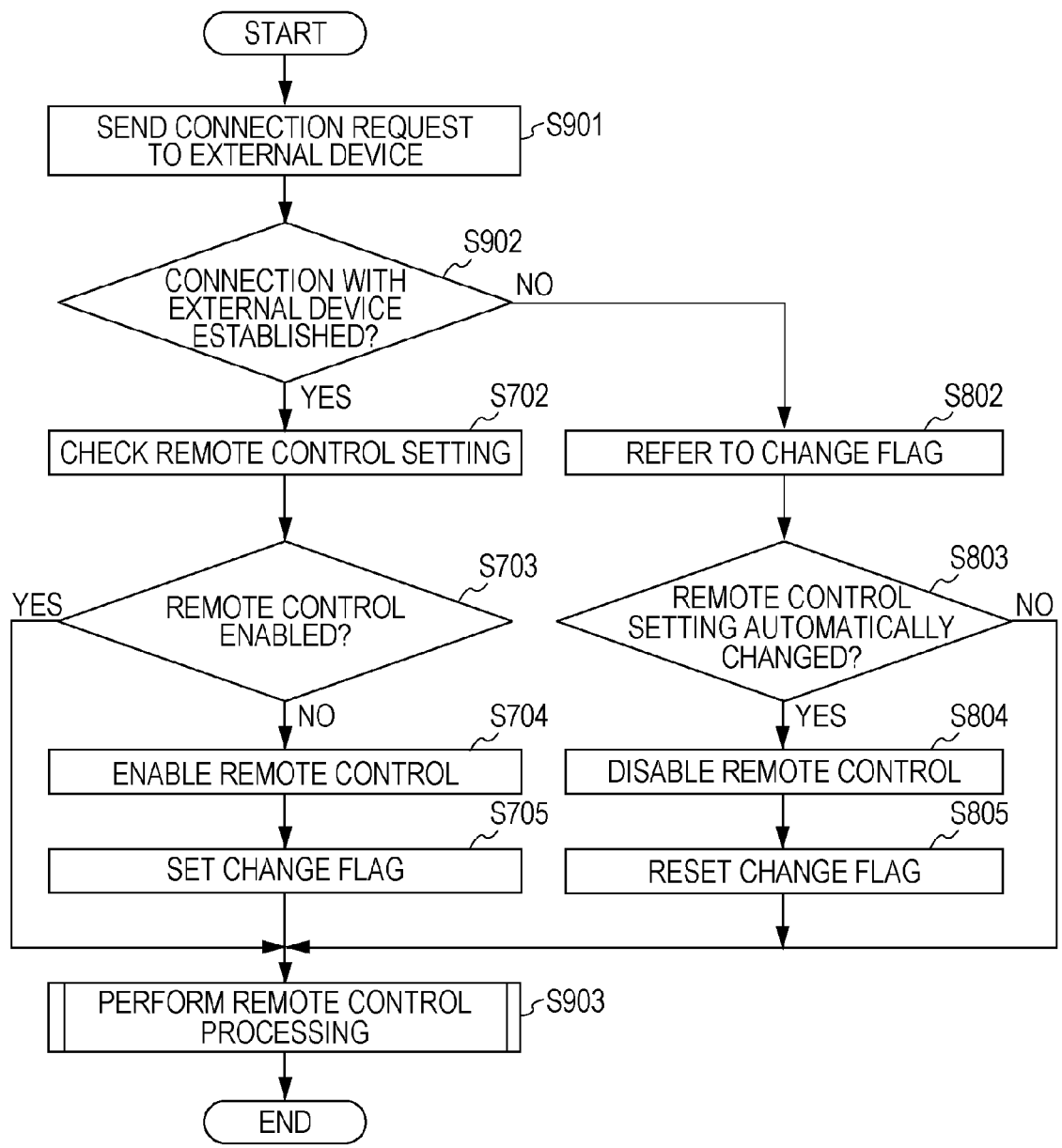
FIG. 9 is a flowchart illustrating a process performed by the camera of the first exemplary embodiment for automatically changing a remote control setting.

In the system where, as illustrated in FIG. 2C, a wireless connection is established and terminated for every data transmission and reception, the camera 100 performs a process of the flowchart of FIG. 9 upon receipt of a remote control signal. In FIG. 9, steps identical to those in FIG. 7 and FIG. 8 are given the same reference numerals.

Upon receipt of a remote control signal, the system controller 101 temporality stores the content of the remote control signal, for example, at a predetermined address in the nonvolatile storage medium 114. Then, in step S901, the system controller 101 sends a connection request to an external device (storage apparatus 109) through the communication interface 107 and the antenna 108.

As described with reference to FIG. 2C, if a connection acceptance response to the connection request is received from the storage apparatus 109, the system controller 101 can confirm that a connection with the storage apparatus 109 through close proximity wireless communication is established.

Upon confirming that the connection with the storage apparatus 109 is established (YES in step S902), the system controller 101 performs the processing of steps S702 to S705. Then, in step S903, the system controller 101 controls each part of the camera 100 such that processing corresponding to the received remote control signal stored at the predetermined address in the nonvolatile storage medium 114 is performed. The processing of step S903 corresponds to that of steps S601 to S603 illustrated in FIG. 6.

On the other hand, if it cannot be confirmed that the connection with the storage apparatus 109 is established (NO in step S902), the system controller 101 performs the processing of steps S802 to S805. Then, in step S903, the system controller 101 controls each part of the camera 100 such that processing corresponding to the received remote control signal stored at the predetermined address in the nonvolatile storage medium 114 is performed.

Thus, while a connection with the storage apparatus 109 through close proximity wireless communication is established, even when the camera 100 is set to disable (reject) remote control, the setting is automatically changed to enable (accept) remote control.

Therefore, when the camera 100 is placed on the storage apparatus 109 and thus a close proximity wireless communication connection is established therebetween, it is possible to control the camera 100 with the remote controller 111 regardless of the setting of the camera 100.

This is convenient for the user, because the user can control the camera 100 with the remote controller 111 during close proximity wireless communication, without having to perform a menu operation to check the current remote control setting and change the remote control setting every time close proximity wireless communication is performed.

Additionally, when it is confirmed that a close proximity wireless communication connection is established and the setting of the camera 100 is changed to enable remote control, if the setting of the camera is restored to the state which disables remote control at the time of disconnection, the usability of the camera 100 can be further improved.

In the present exemplary embodiment, when the remote control setting is automatically changed after it is confirmed that a communication connection is established, the remote control setting stored in the nonvolatile storage medium 114 is changed accordingly. Then, the changed remote control setting is restored to the original state after termination of the connection. However, it is not always necessary to change the remote control setting stored in the nonvolatile storage medium 114.

For example, when it is confirmed that a communication connection is established, remote control may be always accepted regardless of the remote control setting. In this case, upon receipt of a remote control signal, a determination may be made as to whether a connection with an external device is established. If it can be confirmed that the connection with the external device is established, processing corresponding to the remote control signal may be performed. Here, it is not necessary to perform the processing of steps S702 to S705 and the processing of steps S802 to S805.

Second Exemplary Embodiment

A second exemplary embodiment of the present invention will now be described. Close proximity wireless communication can be performed not only between completely different devices, such as between a camera and a storage apparatus described in the first exemplary embodiment, but also between devices of the same type, such as between cameras.

In the latter case, it may be possible to operate the cameras with the same remote control signal when, for example, the cameras are of the same model or are products of the same manufacturer. When cameras of the same model perform close proximity wireless communication therebetween, if the user uses a remote controller to control one of the cameras, since the two cameras are located close to each other, both of the two cameras may receive a remote control signal from the remote controller and operate in accordance with the received signal.

Therefore, the present exemplary embodiment provides a mechanism in which, even when devices of the same model perform close proximity wireless communication, only one of the devices operates on the basis of a remote control signal.

Figure 11:
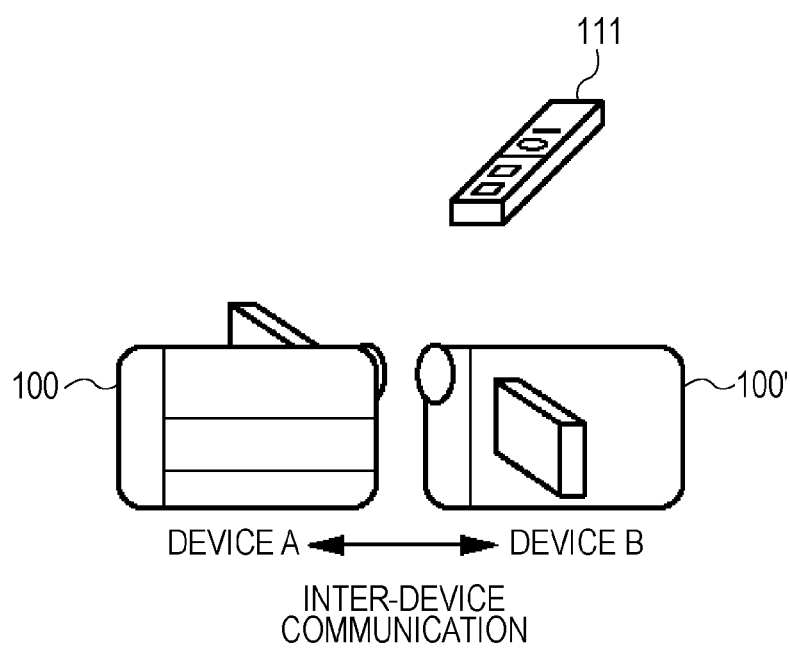
FIG. 11 schematically illustrates how a communication system according to second and third exemplary embodiments of the present invention is used.

FIG. 11 schematically illustrates how a communication system of the present exemplary embodiment is used. Device A and device B are a camera 100 and a camera 100', respectively, which are examples of communication apparatuses capable of performing close proximity wireless communication. For example, device A and device B may have the same configuration. In the present exemplary embodiment, device A serves as a data transmitting device and device B serves as a data receiving device. The remote controller 111 is capable of transmitting a remote control signal common to both the cameras 100 and 100'.

Figure 12:
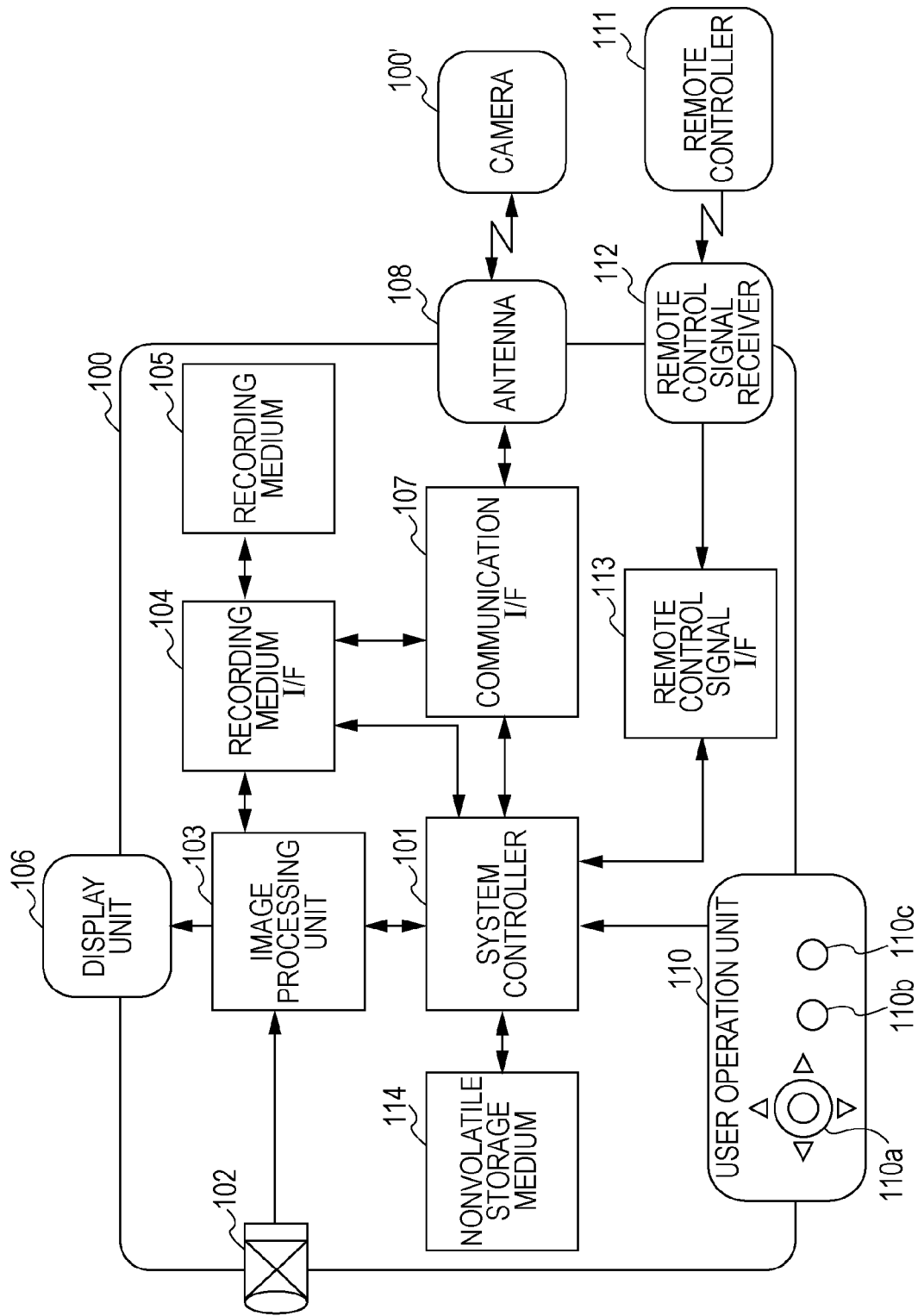
FIG. 12 is a block diagram illustrating an example configuration of the communication system according the second and third exemplary embodiments.

FIG. 12 is a block diagram illustrating an example configuration of the communication system according the present exemplary embodiment. The camera 100 illustrated in FIG. 12 has the same configuration as that of the first exemplary embodiment. For example, a system controller 101' is a component of the camera 100'. The cameras 100 and 100' may be replaced with a combination of any devices operable in accordance with a common remote control signal.

Figure 13:
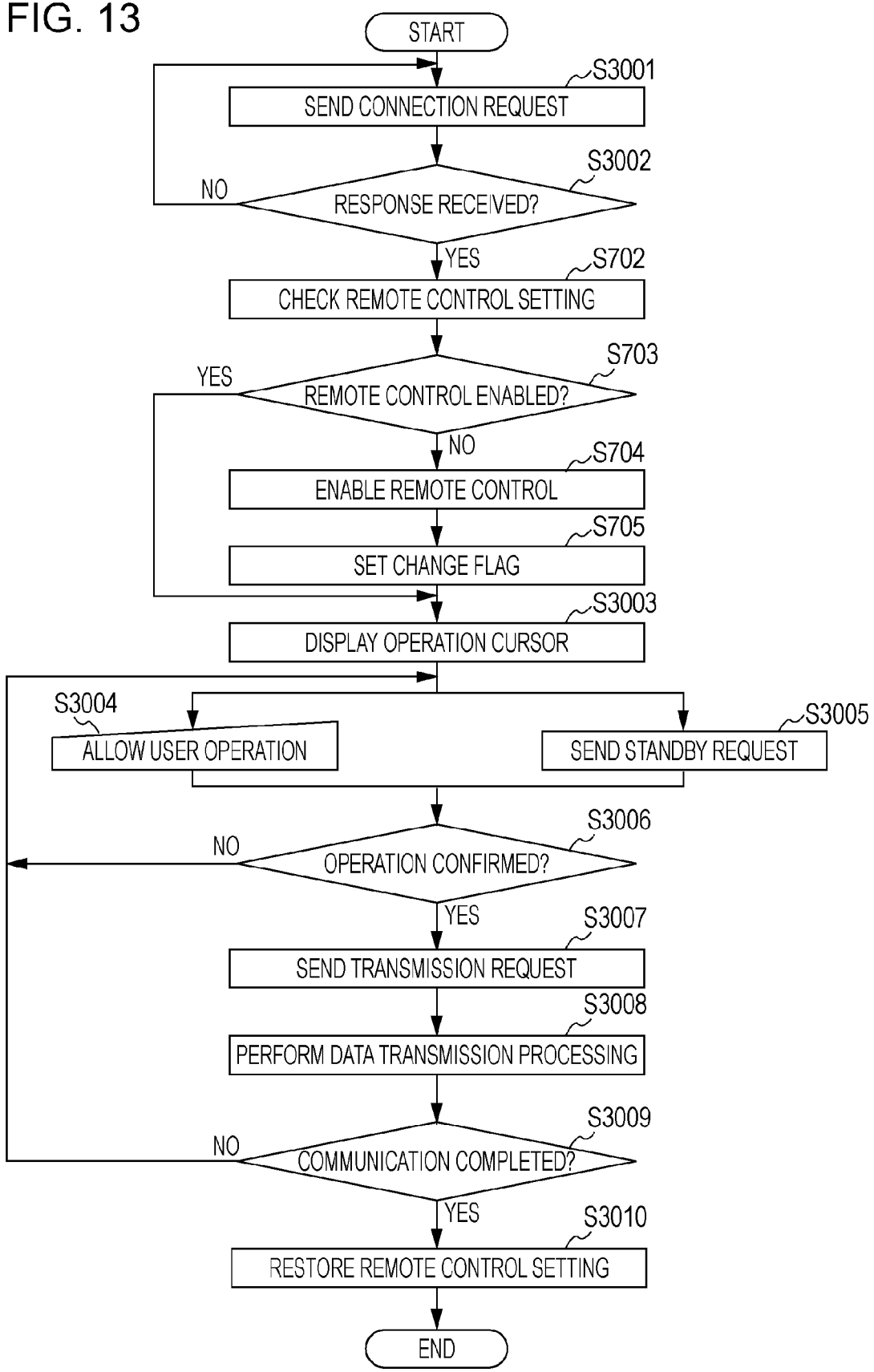
FIG. 13 is a flowchart illustrating an operation of a camera serving as a transmitting device of the second exemplary embodiment.
Figure 14:
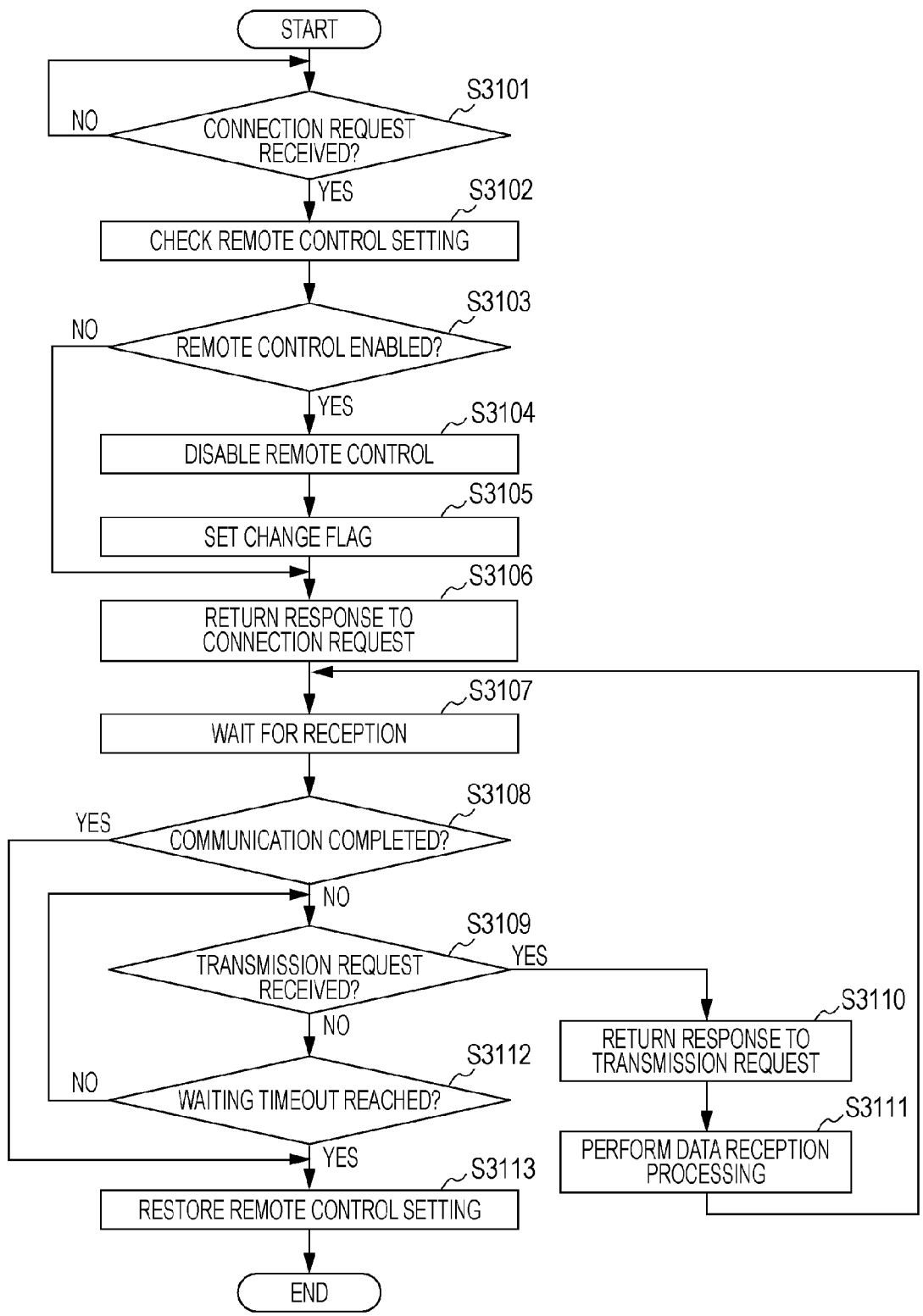
FIG. 14 is a flowchart illustrating an operation of a camera serving as a receiving device of the second exemplary embodiment.

FIG. 13 and FIG. 14 are flowcharts illustrating operations of device A (camera 100) and device B (camera 100') according to the present exemplary embodiment.

A process illustrated in FIG. 13 is performed when the camera 100 is set to an operation mode which allows the camera 100 to transmit data through close proximity wireless communication. Specifically, the process of FIG. 13 starts when "image transmission" or "selected-image transmission" is selected from the wireless communication menu (see FIG. 4B) and the set key 110b is pressed. Similarly, a process illustrated in FIG. 14 is performed when the camera 100' is set to an operation mode which allows the camera 100' to receive data through close proximity wireless communication. Specifically, the process of FIG. 14 starts when "image reception" is selected from the wireless communication menu (see FIG. 4B) and the set key 110b is pressed.

Referring to FIG. 13, in step S3001, the system controller 101 sends a connection request through the communication interface 107. In step S3002, the system controller 101 determines whether a response (connection acceptance response) to the connection request sent in step S3001 has been received. If the response has not been received (NO in step S3002), the process returns to step S3001, where the system controller 101 sends the connection request again after a certain period of time.

On the other hand, if the connection acceptance response to the connection request has been received (YES in step S3002), the system controller 101 performs the processing of steps S702 to S705 described in the first exemplary embodiment. That is, if remote control is disabled, the system controller 101 changes the remote control setting such that remote control is enabled. Thus, at least after this point, the user can control the camera 100 with the remote controller 111.

As will be described below, the camera 100' serving as a receiving device performs processing such that the remote control setting disables remote control. Therefore, it is possible to prevent a situation where the cameras 100 and 100' both operate by manipulating the remote controller 111.

In step S3003, the system controller 101 displays an operation cursor etc. on the display unit 106 to indicate that the camera 100 is in an operable state. For example, the system controller 101 displays the single-image playback screen (see FIG. 4C) in the "image transmission mode", and displays the thumbnail playback screen (see FIG. 4E) in the "selected-image transmission mode".

In step S3004, the user performs an operation, such as selection of a desired image. The user may use the user operation unit 110, but using the remote controller 111 makes it possible to easily operate the camera 100 while maintaining a communication connection between the cameras 100 and 100'.

In step S3005, until the user inputs an instruction to execute transmission, the system controller 101 periodically performs data communication, such as status notification, with the camera 100' and requests the camera 100' to maintain a communication standby state.

In step S3006, the system controller 101 determines whether the user operation has been confirmed, that is, whether the user has given an instruction to execute transmission. The process proceeds to step S3007 if it is determined that the user operation has been confirmed (YES in step S3006), and returns to step S3004 if it is determined that the user operation has not been confirmed (NO in step S3006).

In the present exemplary embodiment, for example, upon detecting in the "image transmission mode" that the set key 110b has been pressed on the single-image playback screen (see FIG. 4C) and an instruction to execute transmission has been input, the system controller 101 determines that the user operation has been confirmed. Similarly, upon detecting in the "selected-image transmission mode" that the set key 110b has been pressed and held on the thumbnail playback screen (see FIG. 4E), the system controller 101 determines that the user operation has been confirmed.

In step S3007, the system controller 101 sends a transmission request through the communication interface 107 to the camera 100'. Here, a request to transmit specified image data is sent as a transmission request to the camera 100'. In response, the system controller 101' of the camera 100' returns a request acceptance response indicating acceptance of the request (step S3110 in FIG. 14).

Upon receipt of the response, in step S3008, the system controller 101 performs data transmission processing. Here, the system controller 101 reads one or more pieces of specified image data from the recording medium 105 and transmits the read image data through the communication interface 107 to the camera 100'.

In step S3009, the system controller 101 determines whether the communication has been completed. If the communication has been completed (YES in step S3009), the system controller 101 restores the remote control setting in step S3010 and terminates the process. The processing performed in step S3010 may be the same as that performed in steps S802 to S805 in the first exemplary embodiment. If the communication has not been completed (NO in step S3009), the process returns to step S3004 and step S3005 to repeat the processing described above.

Referring to FIG. 14, in step S3101, the system controller 101' determines whether a connection request has been received through a communication interface 107'. If the connection request has not been received (NO in step S3101), the system controller 101' repeats the processing of step S3101.

If the cameras 100 and 100' approach each other within a communication range and the connection request has been received (YES in step S3101), the system controller 101' checks the remote control setting stored in a nonvolatile storage medium 114' in step S3102.

In step S3103, the system controller 101' determines whether the remote control setting obtained in step S3102 is a setting ("ON") which enables remote control or a setting ("OFF") which disables remote control. If a setting which disables remote control is set (NO in step S3103), since the camera 100' (receiving device) is already set not to accept remote control, the system controller 101' does not change the remote control setting. Then, the process proceeds to step S3106. On the other hand, if a setting which enables remote control is set (YES in step S3103), the system controller 101' changes the remote control setting in step S3104. This is to prevent the camera 100' from being operated by manipulating the remote controller 111 which is intended for use in controlling the camera 100. That is, the system controller 101' changes the remote control setting stored in the nonvolatile storage medium 114' to a setting ("OFF") which disables remote control. Then, as in the case of the first exemplary embodiment, the system controller 101' sets a change flag in step S3105 to indicate that the original setting has been automatically changed.

In step S3106, the system controller 101' returns a connection acceptance response to the connection request received in step S3101. The length of processing time (T2) between receiving the connection request and returning the connection acceptance response (i.e., from steps S3101 to S3106) is shorter than the length of time (T1) that elapses before the camera 100 (i.e., a sender of the connection request) determines in step S3002 of FIG. 13 that no response has been received (i.e., T1>T2). However, if the processing of steps S3102 to S3105 takes time and T2 is longer than or equal to T1 (i.e., T1≤T2), it is possible to immediately return a response (step S3106) upon receipt of the connection request, and then, perform the processing of steps S3102 to S3105. In this case, the camera 100 (transmitting device) starts transmission, with consideration given to the length of time necessary for the camera 100' (receiving device) to be able to receive data after the response.

In step S3107, the system controller 101' waits for data reception. In step S3108, the system controller 101' determines whether the communication has been completed. If the communication has been completed (YES in step S3108), the process proceeds to step S3113 and otherwise (NO in step S3108) proceeds to step S3109.

In step S3109, the system controller 101' determines whether a transmission request from the camera 100 has been received. If the transmission request has been received (YES in step S3109), the system controller 101' returns a response indicating completion of preparation for data reception to the camera 100 in step S3110.

In step S3111, the system controller 101' performs reception of data (e.g., image data, in the present exemplary embodiment) transmitted from the camera 100, and writes the received data through a recording medium interface 104' to a recording medium 105' when necessary.

If the system controller 101' determines in step S3109 that the transmission request has not been received (NO in step S3109), the process proceeds to step S3112. In step S3112, the system controller 101' measures the length of waiting time to receive the transmission request, and determines whether the transmission request has been received within a predetermined length of time. If the transmission request has not been received from the camera 100 within the predetermined length of time (YES in step S3112), the system controller 101' determines that a processing timeout has occurred. Then, the process proceeds to step S3113. If the predetermined length of time has not elapsed (NO in step S3112), the process returns to step S3109.

In step S3113, the system controller 101' restores the remote control setting and terminates the process. The processing of step S3113 may be the same as that of steps S802 to S805 in the first exemplary embodiment except that the remote control setting which enables remote control is restored.

As described in the first exemplary embodiment, it is not always necessary to change the remote control setting stored in the nonvolatile storage medium 114 or 114'. For example, when it is confirmed that a communication connection is established, remote control may be always accepted regardless of the remote control setting. In this case, after receipt of the connection acceptance response to the connection request, processing may be performed in accordance with the remote control signal received before the communication ends or the connection is terminated. Here, it is not necessary to perform the processing of steps S702 to S705 and step S3010.

Similarly, after receipt of the connection request, regardless of the remote control setting, the system controller 101' may ignore all remote control signals received before the communication ends or the connection is terminated. In this case, it is not necessary to perform the processing of steps S3102 to S3105 and step S3113.

The present exemplary embodiment describes the case where upon receipt of the response to the connection request, the transmitting device checks the remote control setting and enables remote control; and upon receipt of the connection request from the transmitting device, the receiving device checks the remote control setting and disables remote control.

However, the transmitting device may check the remote control setting when an operation mode which enables data transmission is selected, and then may enable remote control where necessary. In this case, the processing of steps S702 to S705 may be performed before step S3001 of FIG. 13.

Similarly, the receiving device may check the remote control setting when an operation mode which enables data reception is selected, and then may disable remote control where necessary. In this case, the processing of steps S3102 to S3105 may be performed before step S3101 of FIG. 14. In particular, to prevent a situation where the transmitting device and the receiving device are simultaneously operated by manipulating the remote controller 111, it is preferable that disabling of remote control in the receiving device be performed before enabling of remote control in the transmitting device is performed.

Although the receiving device disables remote control in the present exemplary embodiment described above, the user may operate the receiving device to obtain data from the transmitting device. In this case, the transmitting device disables remote control and the receiving device enables remote control. Specifically, if it is determined in step S703 of FIG. 13 that remote control is enabled, the remote control setting is changed in step S704 such that remote control is disabled. On the other hand, if it is determined in step S3103 of FIG. 14 that remote control is disabled, the remote control setting is changed in step S3104 such that remote control is enabled.

As described above, in the present exemplary embodiment, even when devices constituting a communication system which uses close proximity wireless communication can be operated by the same remote control signal, it is possible to operate only one of the devices with a remote controller. This is very convenient for the user, because the user does not have to think about whether a plurality of devices in the communication system will be operated by the same signal, and whether the devices are set to enable or disable remote control.

Thus, when the user uses a remote controller to operate a device to be controlled, it is possible to prevent a remote control signal from causing another device to erroneously operate.

Third Exemplary Embodiment

A third exemplary embodiment of the present invention will now be described.

Figure 15:
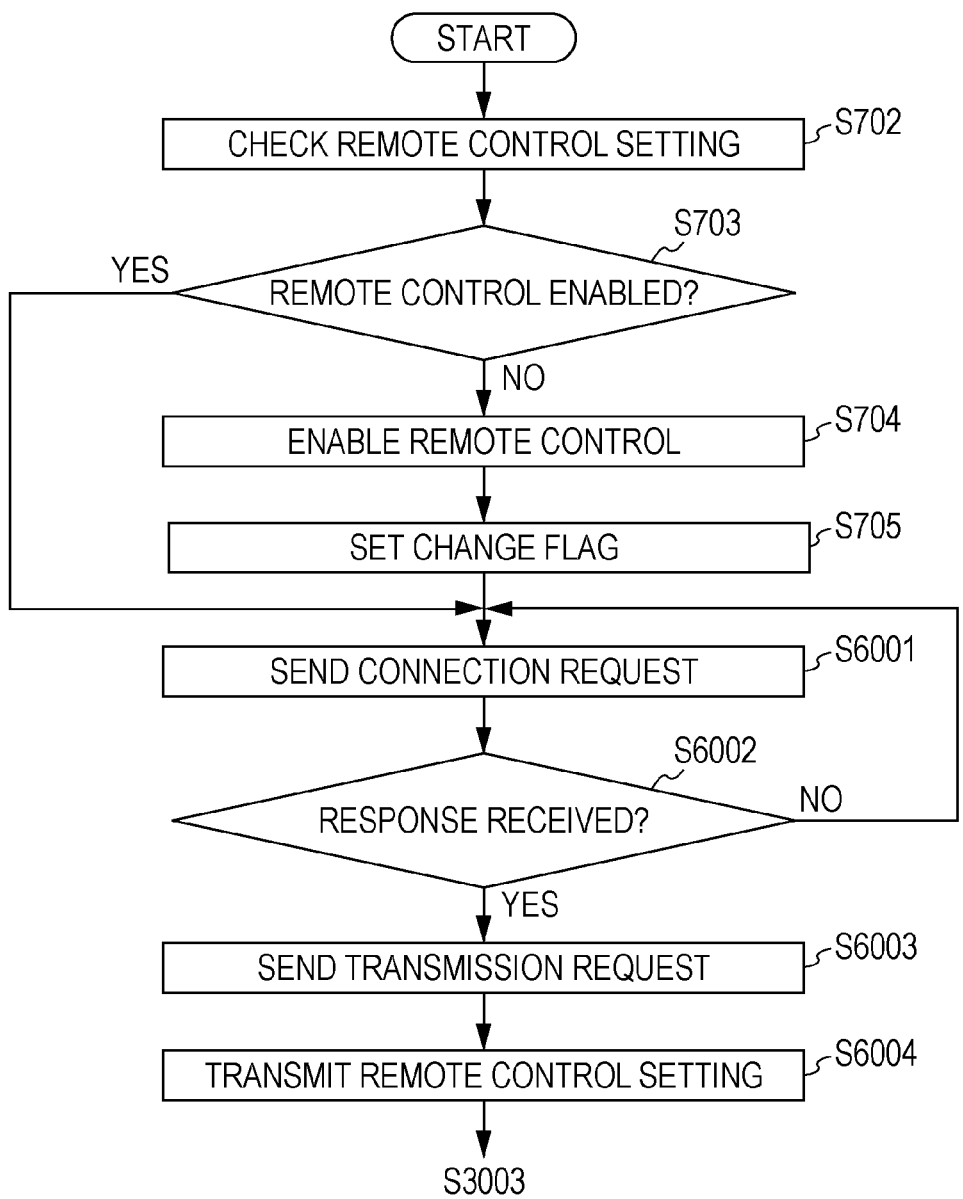
FIG. 15 is a flowchart illustrating an operation of a camera serving as a transmitting device of the third exemplary embodiment.

FIG. 15 and FIG. 16 are flowcharts illustrating operations of devices according to the third exemplary embodiment. Configurations of the devices, data transmission and reception processing, and operations of the processing will not be described here, as they are the same as those of the second exemplary embodiment.

FIG. 15 is a flowchart illustrating an operation of device A (camera 100) at the transmitting end. FIG. 16 is a flowchart illustrating an operation of device B (camera 100') at the receiving end.

As in the case of the second exemplary embodiment, a process illustrated in FIG. 15 is performed when the camera 100 is set to an operation mode which allows the camera 100 to transmit data through close proximity wireless communication. A process illustrated in FIG. 16 is performed when the camera 100' is set to an operation mode which allows the camera 100' to receive data through close proximity wireless communication.

The system controller 101 performs processing of steps S702 to S705 described in the first exemplary embodiment. That is, if remote control is disabled, the system controller 101 changes the remote control setting such that remote control is enabled. Thus, at least after this point, it is possible to control the camera 100 with the remote controller 111.

As will be described below, when the remote control setting of the camera 100' (receiving device) is the same as that of the camera 100 (transmitting device), the camera 100' performs processing that changes the remote control setting to a setting which disables remote control. Therefore, it is possible to prevent a situation where both the cameras 100 and 100' are operated by manipulating the remote controller 111.

In step S6001 of FIG. 15, the system controller 101 sends a connection request through the communication interface 107. In step S6002, the system controller 101 determines whether a connection acceptance response to the connection request sent in step S6001 has been received. If the connection acceptance response has not been received (NO in step S6002), the process returns to step S6001, where the system controller 101 sends the connection request again after a certain period of time.

On the other hand, if the connection acceptance response has been received (YES in step S6002), the process proceeds to step S6003. In step S6003, the system controller 101 sends a transmission request through the communication interface 107 to the camera 100'. Here, the transmission request requesting acceptance of transmission of a remote control setting stored in the nonvolatile storage medium 114 is sent. In response to the request, the system controller 101' returns a request acceptance response to the camera 100 (step S6104 of FIG. 16).

Upon receipt of this response, in step S6004, the system controller 101 reads the remote control setting from the nonvolatile storage medium 114, and transmits the read remote control setting through the communication interface 107 to the camera 100'. After this, data communication processing in the camera 100 can be performed in the same manner as that in step S3003 and the following steps of the second exemplary embodiment.

Referring to FIG. 16, in step S6101, the system controller 101' determines whether a connection request has been received through the communication interface 107'. If the connection request has not been received (NO in step S6101), the system controller 101' repeats the processing of step S6101.

If the cameras 100 and 100' approach each other within a communication distance and the connection request has been received (YES in step S6101), the system controller 101' returns in step S6102 a response indicating acceptance of the connection request received in step S6101. In step S6103, the system controller 101' enters a state of waiting for connection communication. Then, upon receipt of a transmission request from the camera 100 (step S6003 of FIG. 15), the system controller 101' returns a response indicating completion of preparation for data reception in step S6104.

In step S6105, the system controller 101' receives a remote control setting of the camera 100 from the camera 100. In step S6106, the system controller 101' compares a remote control setting stored in the nonvolatile storage medium 114' with the remote control setting received in step S6105. If the two remote control settings match (YES in step S6106), the process proceeds to step S6107. If the two remote control settings do not match (NO in step S6106), the process of FIG. 16 ends. Then, data communication that follows can be processed in the same manner as that in step S3106 and the following steps of the second exemplary embodiment.

In step S6107, to prevent the camera 100' from being operated by manipulating the remote controller 111 which is intended for use in controlling the camera 100, the system controller 101' changes the remote control setting stored in the nonvolatile storage medium 114' to a setting ("OFF") which disables remote control. Then, data communication that follows can be processed in the same manner as that in step S3105 and the following steps of the second exemplary embodiment.

In the present exemplary embodiment, as in the case of the first exemplary embodiment, the remote control setting either enables or disables remote control. However, the remote controller 111 may be capable of transmitting a remote control signal on any of a plurality of channels having different frequencies, and the cameras 100 and 100' may allow the user to specify a channel when enabling remote control. In this case, when the remote control setting is a setting which enables remote control, the remote control setting includes information about a channel on which the remote control signal is to be transmitted.

In this case, even when both the cameras 100 and 100' are set to enable remote control, if a channel specified for enabling remote control in the camera 100 differs from that specified for enabling remote control in the camera 100', the system controller 101' determines in step S6106 that the remote control settings of the two cameras 100 and 100' do not match.

As described above, in the present exemplary embodiment, it is possible to achieve the same effect as that achieved in the second exemplary embodiment. When it is possible to specify a channel on which a remote control signal is to be transmitted, if a channel specified in one device differs from that specified in another, it is not necessary to change the remote control setting of one of the devices. Therefore, the user does not unnecessarily have to disable remote control.

Other Exemplary Embodiments

The above-described exemplary embodiments are exemplary forms of the present invention and may be combined together where appropriate. The above-described exemplary embodiments may be implemented by software on a computer (or a CPU, a microprocessing unit (MPU), or the like) of the communication apparatus. Therefore, a computer program supplied to the computer for implementing at least one of the above-described exemplary embodiments on the computer also implements the present invention. That is, a computer program for implementing the functions of at least one of the above-described exemplary embodiments may be included in the present invention.

A computer program for implementing at least one of the above-described exemplary embodiments may take any form, as long as it is computer-readable. Examples of the computer program may include, but are not limited to, object code, a program executed by an interpreter, and script data supplied to an OS.

A computer program for implementing at least one of the above-described exemplary embodiments may be supplied from a storage medium or through wired or wireless communication to the computer. Examples of the storage medium for supplying the program may include a flexible disk; a hard disk; a magnetic storage medium, such as a magnetic tape; an optical/magneto-optical (MO) storage medium, such as an MO disk, a compact-disk read-only memory (CD-ROM), or a digital versatile disk (DVD); and a nonvolatile semiconductor memory.

Examples of a method for supplying the computer program through wired or wireless communication may include a method which uses a server on a computer network. In this case, a data file (program file) which forms the present invention is stored in the server. The program file may be an executable file or may be source code.

The program file may be downloaded from the server and supplied to a client computer which has accessed the server. The program file may be divided into a plurality of segment files, which may be distributed over different servers. That is, a server apparatus that supplies the program file for implementing at least one of the above-described exemplary embodiments to the client computer may also be included in the present invention.

A computer program for implementing at least one of the above-described exemplary embodiments may be encrypted, stored in a storage medium, and distributed. Then, key information for decrypting the encrypted program may be supplied to users who satisfy predetermined conditions and thus, the users may be allowed to install the program on their computers. The key information may be supplied, for example, by allowing the user to download it from a homepage through the Internet.

A computer program for implementing at least one of the above-described exemplary embodiments may use the functions of an OS running on a computer.

A computer program for implementing at least one of the above-described exemplary embodiments may be formed in part by firmware in an expansion board mounted on a computer, or may be executed by a CPU included in the expansion board.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A communication apparatus comprising:
    a communicating unit configured to communicate with a first external device through wireless communication;
    a receiving unit configured to receive wirelessly a control signal transmitted from a second external device;
    a setting unit configured to set, based on a user operation, a predetermined control setting which enables or disables an operation by the second external device;
    a determining unit configured to make a determination as to whether a positional relation of the communication apparatus and the first external device is in a predetermined relation; and
    a control unit configured to perform control such that, in a case that the determining unit determines that the positional relation of the communication apparatus and the first external device is in the predetermined relation, an operation corresponding to the control signal received by the receiving unit is performed regardless of the predetermined control setting set by the setting unit.

2. The communication apparatus according to claim 1, wherein the determining unit makes the determination in response to receipt of the control signal at the receiving unit.

3. The communication apparatus according to claim 1, wherein, in a case that a predetermined signal is received from the first external device by the communicating unit, the determining unit determines that the positional relation of the communication apparatus and the first external device is in the predetermined relation.

4. The communication apparatus according to claim 1, wherein, in case that a response to a predetermined signal transmitted from the communicating unit to the first external device is received from the first external device by the communicating unit, the determining unit determines that the positional relation of the communication apparatus and the first external device is in the predetermined relation.

5. The communication apparatus according to claim 1, further comprising an antenna,
    wherein the first external device has an antenna,
    wherein the communicating unit communicates with the first external device through wireless communication by using the antenna of the communication apparatus, and
    wherein, in a case that a positional relation of the antenna of the communication apparatus and the antenna of the first external device is in the predetermined relation, the determining unit determines that the positional relation of the communication apparatus and the first external device is in the predetermined relation.

6. The communication apparatus according to claim 1, wherein, in a case that a response to a predetermined signal transmitted from the communicating unit to the first external device is received from the first external device by the communicating unit, the determining unit determines that a connection with the first external device through the wireless communication is established.

7. The communication apparatus according to claim 6, wherein the communicating unit periodically transmits the predetermined signal to the first external device.

8. The communication apparatus according to claim 1, wherein, in a case that it is determined that the positional relation of the communication apparatus and the first external device is in the predetermined relation, and the communication apparatus operates as a device that transmits data to the first external device, the control unit performs control such that an operation corresponding to the control signal received by the receiving unit is performed regardless of the predetermined control setting.

9. The communication apparatus according to claim 1, wherein, in a case that it is determined that the positional relation of the communication apparatus and the first external device is in the predetermined relation and the communication apparatus operates as a device that receives data from the first external device, the control unit performs control such that an operation corresponding to the control signal received by the receiving unit is disabled regardless of the predetermined control setting.

10. The communication apparatus according to claim 1, further comprising an obtaining unit configured to obtain, in a case that the communication apparatus operates as a device that receives data from the first external device, a predetermined control setting of the first external device from the first external device via the communicating unit,
wherein, in a case that the predetermined control setting obtained from the first external device matches the predetermined control setting set by the setting unit, the control unit performs control such that an operation corresponding to the control signal received by the receiving unit is disabled regardless of the predetermined control setting set by the setting unit.

11. A communication apparatus comprising:
a communication unit configured to communicate with a first external device through wireless communication;
a receiving unit configured to receive wirelessly a control signal transmitted from a second external device;
a setting unit configured to set, based on a user operation, a predetermined control setting which enables or disables an operation by the second external device;
a determining unit configured to make a determination as to whether a positional relation of the communication apparatus and the first external device is in a predetermined relation;
a changing unit configured to change the predetermined control setting set by the setting unit, in a case that the determining unit determines that the positional relation of the communication apparatus and the first external device is in the predetermined relation and the predetermined control setting is a setting which disables an operation by the second external device, such that the operation by the second external device is enabled; and
a control unit configured to perform control such that, in accordance with the predetermined control setting, the communication apparatus performs an operation corresponding to the control signal received by the receiving unit.

12. The communication apparatus according to claim 11, wherein the determining unit makes the determination in response to receipt of the control signal at the receiving unit.

13. The communication apparatus according to claim 11, wherein, in a case that a response to a predetermined signal transmitted from the communicating unit to the first external device is received from the first external device by the communicating unit, the determining unit determines that the positional relation of the communication apparatus and the first external device is in the predetermined relation.

14. The communication apparatus according to claim 11, further comprising an antenna,
wherein the first external device has an antenna,
wherein the communicating unit communicates with the first external device through wireless communication by using the antenna of the communication apparatus, and
wherein, in a case that a positional relation of the antenna of the communication apparatus and the antenna of the first external device is in the predetermined relation, the determining unit determines that the positional relation of the communication apparatus and the first external device is in the predetermined relation.

15. The communication apparatus according to claim 11, wherein, in a case that a response to a predetermined signal transmitted from the communicating unit to the first external device is received from the first external device by the communicating unit, the determining unit determines that a connection with the first external device through the wireless communication is established.

16. The communication apparatus according to claim 15, wherein the communicating unit periodically transmits the predetermined signal to the first external device.

17. The communication apparatus according to claim 11, wherein, in a case that it is determined that the positional relation of the communication apparatus and the first external device is in the predetermined relation and the communication apparatus operates as a device that transmits data to the first external device, the changing unit changes the predetermined control setting such that an operation by the second external device is enabled.

18. The communication apparatus according to claim 11, wherein, in a case that it is determined that the positional relation of the communication apparatus and the first external device is in the predetermined relation and the communication apparatus operates as a device that receives data from the first external device, the changing unit changes the predetermined control setting such that an operation by the second external device is disabled.

19. The communication apparatus according to claim 11, further comprising an obtaining unit configured to obtain, in a case that the communication apparatus operates as a device that receives data from the first external device, a predetermined control setting by the first external device from the first external device via the communicating unit,
wherein, in a case that the predetermined control setting obtained from the first external device matches the predetermined control setting set by the setting unit, the changes unit changes the predetermined control setting set by the setting unit to a setting which disables an operation by the second external device.

20. The communication apparatus according to claim 11, wherein, after the changing unit changes the predetermined control setting, in a case that the determining unit determines that the positional relation of the communication apparatus and the first external device is not in the predetermined relation, the changing unit changes the changed predetermined control setting back to a previous setting.

21. A communication apparatus comprising:
a communicating unit configured to communicate with a first external device through wireless communication;
a receiving unit configured to receive wirelessly a control signal transmitted from a second external device;
a setting unit configured to set, based on a user operation, a predetermined control setting which enables or disables an operation by the second external device; and
a control unit configured to perform control such that, in a case that it is communicatable with the first external device, an operation corresponding to the control signal received by the receiving unit is performed regardless of the predetermined control setting set by the setting unit.

22. The communication apparatus according to claim 21, wherein a control unit configured to perform control such that, in a case that it is not communicatable with the first external device, in accordance with the predetermined control setting, the communication apparatus performs an operation corresponding to the control signal received by the receiving unit.

23. A communication apparatus comprising:
a communicating unit configured to communicate with a first external device through wireless communication;

a receiving unit configured to receive wirelessly a control signal transmitted from a second external device;

a setting unit configured to set, based on a user operation, a predetermined control setting which enables or disables an operation by the second external device; and a control unit configured to perform control such that, in a case that a positional relation of the communication apparatus and the first external device is in a predetermined relation, an operation corresponding to the control signal received by the receiving unit is performed regardless of the predetermined control setting set by the setting unit.

24. The communication apparatus according to claim 23, wherein a control unit configured to perform control such that, in a case that the positional relation of the communication apparatus and the first external device is not in the predetermined relation, in accordance with the predetermined control setting, the communication apparatus performs an operation corresponding to the control signal received by the receiving unit.

25. A communication apparatus comprising:

a communicating unit configured to communicate with a first external device through wireless communication;

a receiving unit configured to receive wirelessly a control signal transmitted from a second external device;

a setting unit configured to set, based on a user operation, a predetermined control setting which enables or disables an operation by the second external device; and a control unit configured to perform control such that, in a case that a signal transmission is executable between the communication apparatus and the first external device, an operation corresponding to the control signal received by the receiving unit is performed regardless of the predetermined control setting set by the setting unit.

26. The communication apparatus according to claim 25, wherein a control unit configured to perform control such that, in a case that the signal transmission is not executable between the communication apparatus and the first external device, in accordance with the predetermined control setting, the communication apparatus performs an operation corresponding to the control signal received by the receiving unit.

27. A method for controlling a communication apparatus which is able to communicate with a first external device, the method comprising:

receiving wirelessly a control signal transmitted from a second external device;

setting, via a setting unit and based on a user operation, a predetermined control setting which enables or disables an operation by the second external device;

determining whether a positional relation of the communication apparatus and the first external device is in a predetermined relation; and performing control such that, in a case that it is determined that the positional relation of the communication apparatus and the first external device is in the predetermined relation, an operation corresponding to the received control signal is performed regardless of the predetermined control setting set by the setting unit.

28. A non-transitory computer-readable storage medium storing a control program executing a control method for controlling a communication apparatus which is able to communicate with a first external device, the method comprising:

receiving wirelessly a control signal transmitted from a second external device;

setting, via a setting unit and based on a user operation, a predetermined control setting which enables or disables an operation by the second external device;

determining whether a positional relation of the communication apparatus and the first external device is in a predetermined relation; and performing control such that, in a case that it is determined that the positional relation of the communication apparatus and the first external device is in the predetermined relation, an operation corresponding to the received control signal is performed regardless of the predetermined control setting set by the setting unit.

29. A method for controlling a communication apparatus which is able to communicate with a first external device, the method comprising:

receiving wirelessly a control signal transmitted from a second external device;

setting, via a setting unit and based on a user operation, a predetermined control setting which enables or disables an operation by the second external device;

determining whether a positional relation of the communication apparatus and the first external device is in a predetermined relation;

changing the predetermined control setting set by the setting unit, in a case that it is determined that the positional relation of the communication apparatus and the first external device is in the predetermined relation and the predetermined control setting is a setting which disables an operation by the second external device, such that the operation by the second external device is enabled; and performing control such that, in accordance with the predetermined control setting, the communication apparatus performs an operation corresponding to the received control signal.

30. A non-transitory computer-readable storage medium storing a control program executing a control method for controlling a communication apparatus which is able to communicate with a first external device, the method comprising:

receiving wirelessly a control signal transmitted from a second external device;

setting, via a setting unit and based on a user operation, a predetermined control setting which enables or disables an operation by the second external device;

determining whether a positional relation of the communication apparatus and the first external device is in a predetermined relation;

changing the predetermined control setting set by the setting unit, in a case that it is determined that the positional relation of the communication apparatus and the first external device is in the predetermined relation and the predetermined control setting is a setting which disables an operation by the second external device, such that the operation by the second external device is enabled; and performing control such that, in accordance with the predetermined control setting, the communication apparatus performs an operation corresponding to the received control signal.

31. A communication apparatus comprising:

a communicating unit configured to communicate with a first external device through wireless communication;

a receiving unit configured to receive wirelessly a control signal transmitted from a second external device;

a setting unit configured to set, based on a user operation, a predetermined control setting which enables or disables an operation by the second external device;

a determining unit configured to make a determination as to whether a positional relation of the communication apparatus and the first external device is in a predetermined relation; and a control unit configured to perform control such that, after the determining unit determines that the positional relation of the communication apparatus and the first external device is in the predetermined relation during the predetermined control setting is set to disable the operation by the second external device, the operation corresponding to the control signal received by the receiving unit is performed.

32. The communication apparatus according to claim 31, wherein, the communicating unit communicates with the first external device through wireless proximity communication.

33. The communication apparatus according to claim 31, wherein, the distance which the communicating unit is capable to communicate is shorter than the distance which the receiving unit is capable to receive the control signal.

34. The communication apparatus according to claim 31, wherein, in a case where the predetermined control setting is set to enable the operation by the second external device, the operation corresponding to the control signal received by the receiving unit is performed without the determination that the positional relation of the communication apparatus and the first external device is in the predetermined relation by the determining unit.

35. A method for controlling a communication apparatus, the method comprising:
  communicating with a first external device through wireless communication;
  receiving wirelessly a control signal transmitted from a second external device;
  setting, based on a user operation, a predetermined control setting which enables or disables an operation by the second external device;
  determining whether a positional relation of the communication apparatus and the first external device is in a predetermined relation; and
  performing, after it is determined that the positional relation of the communication apparatus and the first external device is in the predetermined relation during the predetermined control setting is set to disable the operation by the second external device, the operation corresponding to the received control signal.

* * * * *